(12) United States Patent
Toyozumi et al.

(10) Patent No.: US 9,556,891 B2
(45) Date of Patent: Jan. 31, 2017

(54) FIBER REINFORCED RESIN JOINED BODY, INTERMEDIATE BODY, AND FASTENING ROD

(71) Applicant: Teijin Limited, Osaka-shi, Osaka (JP)

(72) Inventors: Takashi Toyozumi, Osaka (JP); Masumi Hirata, Osaka (JP); Hiroki Sano, Osaka (JP); Takeru Ohki, Osaka (JP); Jianwei Shi, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

(21) Appl. No.: 14/888,358

(22) PCT Filed: Feb. 27, 2015

(86) PCT No.: PCT/JP2015/055749
§ 371 (c)(1),
(2) Date: Oct. 30, 2015

(87) PCT Pub. No.: WO2015/162998
PCT Pub. Date: Oct. 29, 2015

(65) Prior Publication Data
US 2016/0061245 A1    Mar. 3, 2016

(30) Foreign Application Priority Data

Apr. 24, 2014  (JP) .................. 2014-090289
Jul. 3, 2014   (JP) .................. 2014-137739

(51) Int. Cl.
*F16B 19/06*   (2006.01)
*B29C 65/08*   (2006.01)
(Continued)

(52) U.S. Cl.
CPC .............. *F16B 19/06* (2013.01); *B29C 65/08* (2013.01); *B29C 65/601* (2013.01);
(Continued)

(58) Field of Classification Search
CPC .............. F16B 5/04; F16B 19/04; F16B 19/06
(Continued)

(56) References Cited

U.S. PATENT DOCUMENTS 1,457,008 A * 5/1923 Smith ................ F16B 19/06
29/432
1,966,835 A * 7/1934 Stites ................. F16B 4/004
411/424
(Continued)

FOREIGN PATENT DOCUMENTS

JP    S64-87907 A    4/1989
JP    H03-205132 A   9/1991
(Continued)

OTHER PUBLICATIONS

Apr. 21, 2015—International Search Report—Intl App PCT/JP2015/055749.
(Continued)

*Primary Examiner* — Flemming Saether
(74) *Attorney, Agent, or Firm* — Banner & Witcoff, Ltd.

(57) ABSTRACT

There is provided a joined body in which two or more members Yi including a fitting hole are fastened, in which a fastening rod including reinforcing fibers and a thermoplastic resin is positioned in the fitting hole, the fastening rod is caulked by heat, and the members Yi are caulking-fastened.

5 Claims, 17 Drawing Sheets

(51) Int. Cl.
    *B29C 70/06*     (2006.01)
    *F16B 5/04*     (2006.01)
    *B29C 65/60*     (2006.01)
    *B29C 65/00*     (2006.01)
    *B29C 65/02*     (2006.01)

(52) U.S. Cl.
    CPC .......... *B29C 66/1122* (2013.01); *B29C 66/21* (2013.01); *B29C 66/41* (2013.01); *B29C 66/81423* (2013.01); *B29C 66/81429* (2013.01); *B29C 66/81431* (2013.01); *B29C 66/8322* (2013.01); *B29C 66/83221* (2013.01); *B29C 70/06* (2013.01); *F16B 5/04* (2013.01); *B29C 65/02* (2013.01)

(58) Field of Classification Search
    USPC .......................................................... 411/501
    See application file for complete search history.

(56) References Cited

U.S. PATENT DOCUMENTS

| | | | | |
|---|---|---|---|---|
| 2,194,458 | A * | 3/1940 | Eckler | ................ F16B 19/06 29/509 |
| 2,196,144 | A * | 4/1940 | Eckler | ................ F16B 19/06 29/509 |
| 2,510,693 | A * | 6/1950 | Green | ................ B29B 15/125 156/441 |
| 4,253,226 | A * | 3/1981 | Takeda | ................ A44B 17/0035 24/691 |
| 4,687,396 | A * | 8/1987 | Berecz | ................ B29C 65/601 264/249 |
| 4,761,871 | A | 8/1988 | O'Connor et al. | |
| 5,153,978 | A | 10/1992 | Simmons | |
| 5,354,160 | A | 10/1994 | Pratt et al. | |
| 5,361,483 | A * | 11/1994 | Rainville | ............ B29C 66/7394 29/524.1 |
| 7,351,022 | B2 * | 4/2008 | Denslow | ................ F16B 5/04 411/501 |
| 8,448,324 | B2 * | 5/2013 | Berger | ................ B29C 70/845 29/521 |
| 2005/0125985 | A1 * | 6/2005 | Adams | ................ B21J 15/02 29/524.1 |
| 2007/0158011 | A1 | 7/2007 | Tominaga et al. | |
| 2014/0154494 | A1 | 6/2014 | Kato et al. | |

FOREIGN PATENT DOCUMENTS

| | | |
|---|---|---|
| JP | H05-504311 A | 7/1993 |
| JP | H09-323360 A | 12/1997 |
| JP | 2005-246941 A | 9/2005 |
| JP | 2006-153213 A | 6/2006 |
| WO | 2012-137985 A1 | 10/2012 |

OTHER PUBLICATIONS

Apr. 21, 2015—(WO) Written Opinion of ISA—Intl App PCT/JP2015/055749.

\* cited by examiner

— 1 —

FIBER REINFORCED RESIN JOINED BODY, INTERMEDIATE BODY, AND FASTENING ROD

CROSS REFERENCE TO RELATED APPLICATIONS

This is a U.S. National Phase Application under 35 U.S.C. §371 of International Application No. PCT/JP2015/055749, filed Feb. 27, 2015, which claims priority to Japanese Application Nos. 2014-090289 and 2014-137739 filed Apr. 24, 2014 and Jul. 3, 2014, respectively, the entire disclosures of which are incorporated herein by reference.

TECHNICAL FIELD

The present invention relates to a joined body in which members are fastened by using a fastening rod including a reinforcing fiber and a thermoplastic resin.

Further, the present invention relates to a joined body formed by fastening a first member and a second member which are an example of a member to be fastened with a fastening rod, and an intermediate body and a fastening rod which are used for forming the joined body.

More specifically, the present invention relates to a joined body having excellent joining strength, and the joined body is preferably applicable to structural components represented by an automobile.

BACKGROUND

In the related art, a resin rivet, which is an example of a fastening rod, has advantages such as easily molding, reducing weight as well as high corrosion resistance, and the resin rivet is widely used for fastening various components such as a synthetic resin product, a leather or a fabric, and a paper product (for example, Patent Document 1).

In the resin rivet, a method of "caulking" the resin rivet by plastic deformation is used, and the resin rivet is able to be prepared separately from a member to be fastened, and thus is suitably applicable to a position at which a boss or a rib integrated with a shaped product is not able to be easily molded.

In general, the resin rivet includes a flat head part, and a body part which is narrower than the head part. When a first member and a second member are fastened by using the resin rivet, a caulking method is used in which the body part is inserted into a first fitting hole provided in the first member and a second fitting hole provided in the second member from the first member side, and in a state where the head part is in contact with the first member, a portion of the body part, protruding from the second member, is plastically deformed into the shape of a curl.

Also, a joined body fastened by caulking in which a protruding substance such as a rib and a boss is provided in advance in a member to be fastened and a tip end of the protruding substance is deformed by heat has high joining strength in a peeling direction. In this joined body, various methods such as using heat and ultrasonic waves are applicable for a heating method at the time of performing the caulking, and thus the joined body is widely used in various industrial fields (Patent Document 2).

CITATION LIST

Patent Document

[Patent Document 1] JP-A-2006-153213
[Patent Document 2] JP-A-2005-246941

SUMMARY OF INVENTION

Problem to be Solved by Invention

However, in a case where the resin rivet disclosed in Patent Document 1 is caulked for fastening, when ultrasonic waves are applied, it takes excessively long time to apply the ultrasonic waves, and thus it is difficult to manufacture the joined body by completing the caulking and fastening in a short period of time. This is because a mechanical vibration due to the ultrasonic waves is attenuated in the resin, and the mechanical vibration is used for efficiently melting the resin. In addition, by reducing the volume of a caulking portion, it is possible to complete the fastening in a short period of time, but in this case, the joining strength decreases.

On the other hand, the joining method disclosed in Patent Document 2 has an advantage that welding is able to be performed by using the ultrasonic waves, but it is necessary to so strictly position the protruding substance, and thus the manufacturing cost increases.

Therefore, an object of the present invention is to provide a joined body which has excellent joining strength of a joining portion and is able to be efficiently fastened.

Solution to Problem

As a result of intensive studies of the present inventors, it has found that the problems described above are able to be solved by the following method, and thus the present invention has achieved.

1. A joined body in which two or more members Yi including a fitting hole are fastened, wherein a fastening rod including reinforcing fibers and a thermoplastic resin is positioned in the fitting hole, and the fastening rod is caulked by heat, and the members Yi are caulking-fastened.
2. The joined body according to 1, wherein the thermal caulking is performed by applying ultrasonic waves.
3. The joined body according to 1 or 2, wherein an end portion of the fastening rod protruding from the fitting hole is caulked.
4. The joined body according to any one of 1 to 3, wherein the fastening rod is in the shape of a rivet.
5. The joined body according to any one of 1 to 4, wherein buckling stress of the fastening rod is 75 MPa to 300 MPa.
6. The joined body according to any one of 1 to 5, wherein the reinforcing fibers included in the fastening rod are discontinuous carbon fibers having an average fiber length of 0.01 mm to 10 mm.
7. The joined body according to any one of 1 to 6, wherein the members Yi are a carbon fiber reinforced thermoplastic resin member.
8. The joined body according to 7, wherein carbon fibers included in the members Yi include a carbon fiber bundle.
9. The joined body according to 8, wherein the members Yi contains an isotropic random mat in which a carbon fiber bundle (A) constituted by carbon fibers of greater than or equal to a critical number of single fiber and at least one of a carbon fiber bundle (B1) constituted by carbon fibers of less than the critical number of single fiber and a carbon single yarn (B2) are mixed, and a ratio of the carbon fiber bundle (A) to a total amount of fibers in the isotropic random mat is 20 Vol % to 99 Vol %, and an average number of fibers (N) in the carbon fiber bundle (A) satisfies conditions described below, Critical Number of Single Fiber=$600/D$     (a)

$0.6 \times 10^4/D^2 < N < 1 \times 10^5/D^2$     (b)

wherein D represents an average fiber diameter whose unit is μm of the reinforcing fibers.

10. The joined body according to 1, wherein two or more members Yi include a first member and a second member, and the first member and the second member respectively include a first fitting hole and a second fitting hole, in a state where one end portion of the fastening rod passing through the first fitting hole of the first member and the second fitting hole of the second member is positioned at a first member side, the other end portion of the fastening rod is caulked to fasten the first member and the second member, the fastening rod includes one or more protrusions which are engaged with at least one of the first fitting hole and the second fitting hole, and the other end portion of the fastening rod is caulked by heat.

11. The joined body according to 10, wherein the protrusion is formed in a region facing a circumferential surface of at least one of the first fitting hole and the second fitting hole, and the protrusion is in the shape of a rib extending along a central axis of the fastening rod.

12. The joined body according to 11, wherein a protruding size of the protrusion increases as being closer to the one end portion.

13. The joined body according to 10, wherein the thermal caulking is performed by applying ultrasonic waves.

14. The joined body according to 10, wherein a separating load of the fastening rod from at least one of the first fitting hole and the second fitting hole is greater than or equal to 1 N.

15. An intermediate body which is used in the joined body according to 10 and is made by integrating the fastening rod with at least one of the first member and the second member in a state of passing through at least the first fitting hole, wherein the fastening rod includes one or more protrusions which are engaged with at least one of the first fitting hole and the second fitting hole.

16. The intermediate body according to 15, wherein the protrusion is formed in a region facing a circumferential surface of at least one of the first fitting hole and the second fitting hole, and the protrusion is in the shape of a rib extending along a central axis of the fastening rod.

17. The intermediate body according to 15, wherein a separating load of the fastening rod from at least one of the first fitting hole and the second fitting hole is greater than or equal to 1 N.

18. A fastening rod used in the joined body according to 10, including: reinforcing fibers; a thermoplastic resin; and one or more protrusions which are engaged with at least one of the first fitting hole and the second fitting hole.

19. The joined body according to any one of 1 to 14, wherein the two or more members Yi include a first member and a second member, and the first member and the second member respectively include a first fitting hole and a second fitting hole, in a state in which one end portion of the fastening rod passing through the first fitting hole of the first member and the second fitting hole of the second member is positioned at a first member side, the other end portion of the fastening rod is caulked to fasten the first member and the second member, when the other end portion of the fastening rod is caulked, the other end portion is deformed, and covers a surface of the fastening rod, and the covered surface of the fastening rod includes concaves and convexes.

20. The joined body according to any one of 1 to 14, wherein two or more members Yi include a first member and a second member, and the first member and the second member respectively include a first fitting hole and a second fitting hole, in a state in which one end portion of the fastening rod passing through the first fitting hole of the first member and the second fitting hole of the second member is positioned at a first member side and a gap is present between the fastening rod and the second fitting hole, the other end portion of the fastening rod is caulked to fasten the first member and the second member, and the other end portion is deformed at the time of being caulked and enters into the gap, and the gap is adhered to a surface of the fastening rod.

Advantageous Effects of Invention

In a joined body of the present invention, it is possible to fasten a member by caulking a fastening rod by applying heat to the fastening rod (preferably, by applying ultrasonic waves), and thus the joined body having excellent joining strength is able to be efficiently manufactured.

In addition, it is not necessary to manufacture a protruding substance integrated with a member to be fastened, and thus it is possible to perform caulking and fastening at a suitable and necessary position by using the fastening rod to efficiently manufacture the joined body.

The fastening rod of the present invention is able to suitably fasten a member regardless of the material of the member to be fastened, and is able to freely adjust the length of the fastening rod, and thus it is possible to easily fasten two or more members.

DESCRIPTION OF EMBODIMENTS

A joined body of the present invention is a joined body in which two or more members Yi including a fitting hole are fastened, a fastening rod including reinforcing fibers and a thermoplastic resin is positioned in the fitting hole, and the members Yi is caulking-fastened by applying heat to the fastening rod (preferably, by applying ultrasonic waves to the fastening rod).

1. Fastening Rod

The fastening rod of the present invention includes reinforcing fibers and a thermoplastic resin. Specifically, it is preferable that the thermoplastic resin is a matrix, and the reinforcing fibers are included in the matrix.

(Shape of Fastening Rod)

Figure 1A:
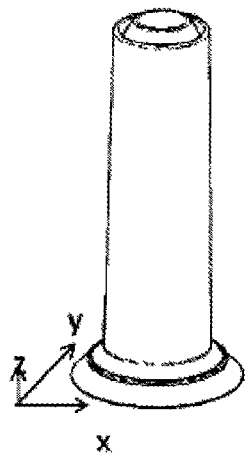
FIG. 1A is a perspective view as an example of a fastening rod.
Figure 1B:
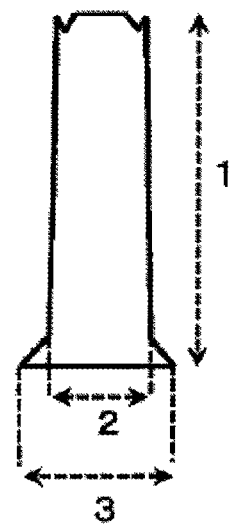
FIG. 1B is a schematic sectional view of the fastening rod in a vertical sectional direction seen from an x direction or a y direction of FIG. 1A.
Figure 1C:
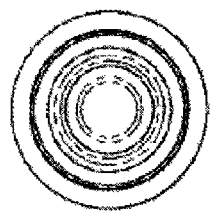
FIG. 1C is a schematic sectional view of the fastening rod in a cross-sectional direction seen from a z direction of FIG. 1A.
Figure 1D:
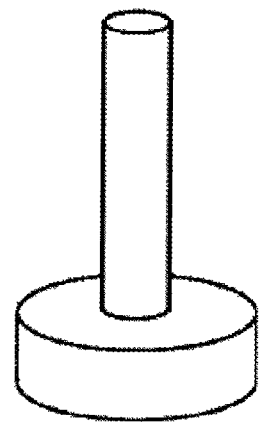
FIG. 1D is a perspective view of the shape of a flange as another example of the fastening rod.

The fastening rod is in a shape of a rod, and the sectional surface thereof is in a shape of a polygon such as a quadrangle, a circle and an ellipse. In consideration of moldability of the fastening rod or workability of the caulking, it is preferable that the sectional surface is in the shape of a circle as illustrated in FIG. 1C. The length of the fastening rod, and the size of the sectional surface are not particularly limited, and it is preferable that the specific length (the length of "1" in FIG. 1B) is 6 mm to 50 mm, and the size of the sectional surface (the length of "2" in FIG. 1B) is a diameter of 4 mm to 22.5 mm. The reinforcing fibers are included in the fastening rod of the present invention, and thus buckling stress is higher than that of a fastening rod manufactured by a resin only, and thus the length of the fastening rod (the length of "1" in FIG. 1B) may be easily elongated than that of the fastening rod manufactured by a resin only. In addition, in a length direction, the diameter may not be constant.

In addition, it is preferable that the maximum sectional area (an area of a portion of "3" in FIG. 1B from a lower side of the plane of paper) of the fastening rod is greater than or equal to the sectional area of the fitting hole. When the sectional area of one end portion of the fastening rod is greater than or equal to the sectional area of the fitting hole, it is possible to fix the one end portion of the fastening rod to the member Yi at the outermost side, and it is possible to manufacture the joined body by caulking only one end portion at the time of caulking the fastening rod (FIG. 2A and FIG. 3), and thus such a structure is preferable.

At this time, it is preferable that the fastening rod of the present invention is in the shape of a rivet. The rivet indicates a component shape, including a head part and a body part, which is inserted into the hole of the member(s) Yi and is caulked to deform the end portion of the fastening rod at the opposite to the head part. Specifically, the rivet indicates the shape illustrated in FIG. 1A (in FIG. 1A the end portion of the fastening rod at the lower side in the plane of paper is the head part). The change amount of the sectional area in the rod direction of the fastening rod is not particularly limited, and it is preferable that the sectional area in the head part side which is not caulked is 2 times to 5 times as large as the sectional area of the fitting hole.

(Applying Ultrasonic Waves to Fastening Rod)

Figure 2A:
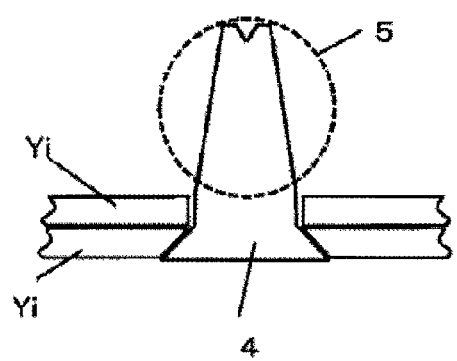
FIG. 2A is, as an example, a schematic view of a state in which the fastening rod is positioned in a fitting hole of a member.
Figure 2B:
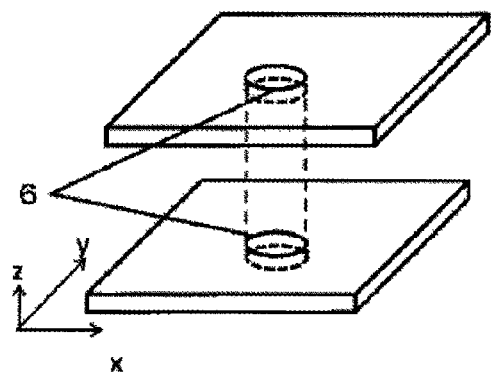
FIG. 2B is an example of the schematic view of the member.
Figure 3A:
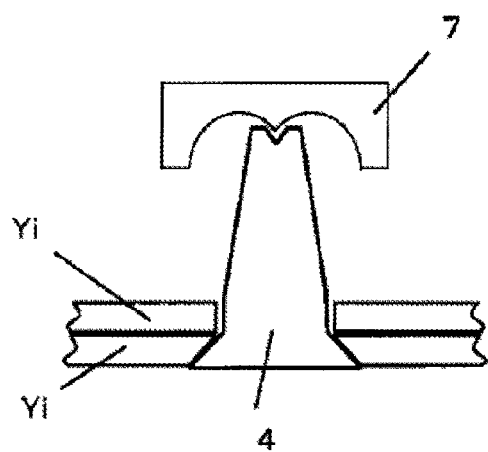
FIG. 3A is a schematic view at the time of applying ultrasonic waves to the fastening rod.
Figure 3B:
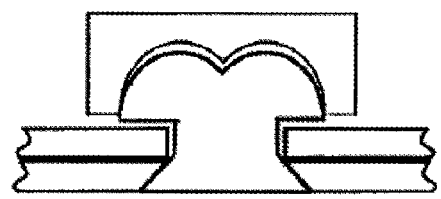
FIG. 3B is a schematic view in which the fastening rod is caulked by applying the ultrasonic waves thereto.
Figure 4A:
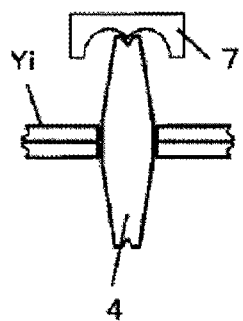
FIG. 4 is a schematic view of a joined body in which both end portions of the fastening rod are caulked and fastened by applying the ultrasonic waves thereto.
Figure 4B:
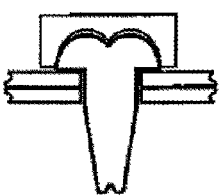
Figure 4C:
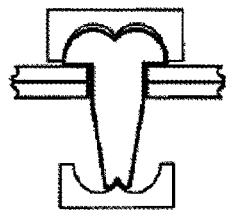
Figure 4D:
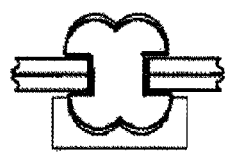

The fastening rod of the present invention is positioned in the fitting hole of the member(s) Yi, and a portion (a protrusion portion) protruding upward from the fitting hole is caulked (FIGS. 3A and 3B). Here, the protrusion portion indicates a portion which is caulked after protruding from the fitting hole of the member (a portion of "5" in FIG. 2).

In the present invention, when the protrusion portion of the fastening rod is caulked by applying the ultrasonic waves thereto, a compression force is exerted in an axis direction of the fastening rod (Z direction in FIG. 1). For this reason, when the fastening rod has suitable strength with respect to the axis direction thereof, the fastening rod is able to be preferably caulked and fastened. Therefore, preferred buckling stress of the fastening rod in the axis direction is 75 MPa to 300 MPa. When the buckling strength of the fastening rod is greater than or equal to 75 MPa, buckling rarely occurs at the time of caulking the protrusion portion, and thus it is possible to perform the caulking and fastening which is able to increase joining strength. In contrast, when the buckling stress is less than or equal to 300 MPa, a change in shape of the protrusion portion by applying the ultrasonic waves becomes sufficient, and thus the unmelted part of the fastening rod (FIG. 5) decreases, and the caulking and fastening is easily performed in a short period of time.

Here, as a measuring method of the buckling stress in the present invention, the buckling stress can be obtained by a compression test according to JIS K 7181:2011.

(Control of Buckling Stress)

A method of controlling the buckling stress of the protrusion portion within the range described above is not particularly limited, and for example, the controlling of the buckling stress within the range may be attained by control the diameter, the height, and the shape of the protrusion portion. In general, the buckling stress tends to be high as the diameter of the protrusion portion of the fastening rod (the portion "5" in FIG. 2) becomes greater and the height thereof becomes shorter. In addition, the buckling stress tends to be high as a base of the protrusion portion becomes larger than the tip end.

In addition, a method of controlling the buckling stress of the fastening rod is not particularly limited, and for example, the controlling of the buckling stress may be attained by controlling the tensile modulus of the reinforcing fibers included in the fastening rod, the content of the reinforcing fibers, the average fiber length of the reinforcing fibers, and the fiber diameter of the reinforcing fibers.

(Shape of Protrusion Portion ("5" in FIG. 2))

The shape of the protrusion portion is not particularly limited, and specifically, the protrusion portion may be in the shape of a cylinder, a circular cone, a rectangular cylinder, a pyramid, a trapezoid, and the like. Among them, the shapes of a cylinder, a circular cone, a pyramid, and a trapezoid have few elements depending on a draft angle of a mold at the time of molding the fastening rod, and thus are preferably used. As an example, when the protrusion portion is in the shape of a cylinder, the diameter of the protrusion portion may be selected from a range of 4 mm to 22.5 mm, and the height may be selected from a range of 6 mm to 45 mm. In addition, when the protrusion portion is in the shape of a cylinder, it is preferable that the height of the protrusion portion is in a range of 0.5 times to 11.1 times as large as the diameter of the protrusion portion.

(Applying of Ultrasonic Waves to Caulking Portion)

It is preferable that the fastening rod of the present invention is caulked by the ultrasonic waves.

In the present invention, the "caulking" indicates fastening of the members Yi, and indicates that the fastening rod passes through holes of the two or more members Yi, a protruding tip end portion (a caulking portion) is deformed (crushed) by using a tool or the like to join the members Yi. The fastening rod after being deformed is caught on the outer side of the hole, and thus the fastening rod and the members Yi are not detached from each other.

Figure 5:
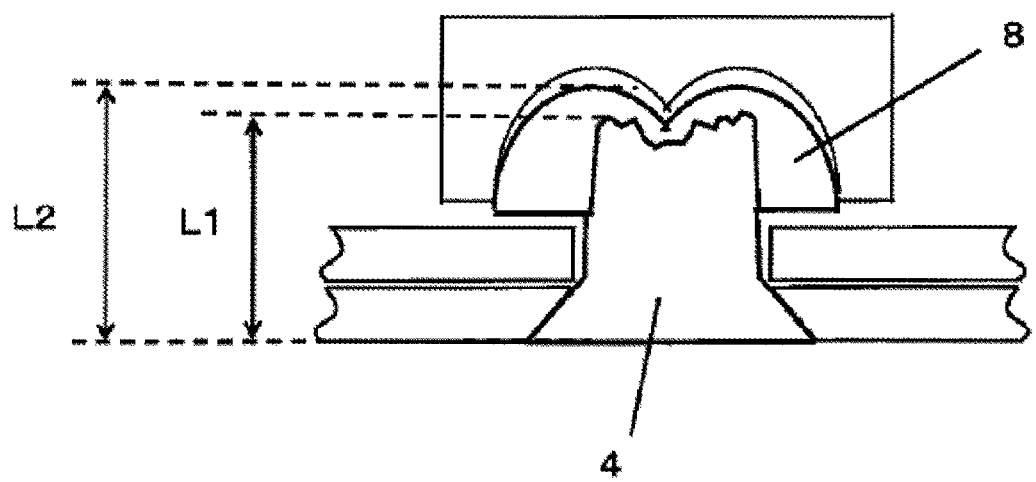
FIG. 5 is a schematic view illustrating that an unmelted part is generated in the fastening rod after applying the ultrasonic waves thereto, in which an umbrella side ("8" in FIG. 5) is dissolved and caulked, and a cylinder side ("4" in FIG. 5) remains without being melted.

After the ultrasonic waves are applied to the protrusion portion of the fastening rod, when the unmelted part of the protrusion portion in the caulking portion satisfies a range of $0<L1/L2<0.6$ (L1: length of the unmelted part of the protrusion portion after the caulking, and L2: height of the protrusion portion after the caulking, FIG. 5), excellent joining strength tends to be obtained, and thus the fastening rod is able to be preferably used. The unmelted part the protrusion portion in the caulking portion preferably satisfies $0<L1/L2<0.5$.

A method of controlling the unmelted part of the protrusion portion is not particularly limited, and specifically, a method of controlling the buckling stress of the protrusion portion or controlling the application of the ultrasonic waves is exemplified. As the conditions for applying the ultrasonic waves, the amplitude of the ultrasonic waves, pressure, time, and the like are exemplified. The unmelted part the protrusion portion tends to be increased as a time period for applying the ultrasonic waves to the tip end of the protrusion portion becomes shorter.

(Reinforcing Fiber in Fastening Rod)

The type of the reinforcing fibers included in the fastening rod which is used in the present invention may be suitably selected according to the type of the matrix, the usage of the joined body of the present invention, and the like, and is not particularly limited. For this reason, as the reinforcing fibers used in the present invention, either an inorganic fiber or an organic fiber is preferably used.

As the inorganic fiber, for example, a carbon fiber, an activated carbon fiber, a graphite fiber, a glass fiber, a tungsten carbide fiber, a silicon carbide fiber (a silicon carbide fiber), a ceramic fiber, an alumina fiber, a natural fiber, a mineral fiber such as basalt, a boron fiber, a boron nitride fiber, a boron carbide fiber, a metal fiber, and the like may be included. As the metal fiber, for example, an aluminum fiber, a copper fiber, a brass fiber, a stainless steel fiber, a steel fiber, and the like may be included. As the glass fiber, a glass fiber formed of E glass, C glass, S glass, D glass, T glass, a quartz glass fiber, a borosilicate glass fiber, or the like may be included. As the organic fiber, for example, a fiber formed of a resin material such as polyaramide, polyparaphenylene bezoxazole (PBO), polyphenylene sulfide, polyester, acryl, polyamide, polyolefin, polyvinyl alcohol, polyarylate, or the like may be included.

In the present invention, two or more types of reinforcing fibers may be used in combination. In this case, a plurality of types of the inorganic fiber may be used in combination, a plurality of types of the organic fiber may be used in combination, or the inorganic fiber and the organic fiber may be used in combination. As an embodiment of using the plurality of types of the inorganic fiber in combination, for example, an embodiment of using a carbon fiber and a metal fiber in combination, an embodiment of using a carbon fiber and a glass fiber in combination, and the like may be included. As an embodiment of using the plurality of types of the organic fiber in combination, for example, an embodiment of using an aramid fiber and a fiber formed of other organic materials in combination, and the like may be included. Further, as an embodiment of using the inorganic fiber and the organic fiber in combination, for example, an embodiment of using a carbon fiber and an aramid fiber in combination may be included.

The reinforcing fibers used in the present invention may be a reinforcing fiber in which a sizing agent is attached to the surface. When the reinforcing fiber to which the sizing agent is attached is used, the type of the sizing agent may be suitably selected according to the type of the reinforcing fiber and the matrix, and is not particularly limited.

The form of the reinforcing fibers used in the present invention is not particularly limited, and for example, may be a woven fabric, a knitted fabric, a unidirectional material, a continuous fiber, a discontinuous fiber having a specific length, or a combination thereof.

(Carbon Fiber)

In the present invention, it is preferable that a carbon fiber is used as the reinforcing fibers included in the fastening rod. This is because the carbon fiber can obtain the joined body of the present invention having light weight and excellent strength.

As the carbon fiber, in general, a polyacrylonitrile (PAN)-based carbon fiber, a petroleum oil and coal pitch-based carbon fiber, a rayon-based carbon fiber, a cellulose-based carbon fiber, a lignin-based carbon fiber, a phenol-based carbon fiber, a vapor phase growth-based carbon fiber, and the like are known, and in the present invention, any carbon fiber may be preferably used. Among them, in the present invention, it is preferable that the polyacrylonitrile (PAN)-based carbon fiber is used from a viewpoint of excellent tensile strength. When the PAN-based carbon fiber is used as the reinforcing fibers, the tensile modulus thereof is preferably in a range of 100 GPa to 600 GPa, is more preferably in a range of 200 GPa to 500 GPa, and is even more preferably in a range of 230 GPa to 450 GPa. In addition, the tensile strength is preferably in a range of 2,000 MPa to 10,000 MPa, and is more preferably in a range of 3,000 MPa to 8,000 MPa.

(Fiber Length of Reinforcing Fiber)

The fiber length of the reinforcing fibers used in the present invention may be suitably determined according to the type of the reinforcing fibers or the type of the matrix, an orientation state of the reinforcing fibers in the fastening rod, and the like, and is not particularly limited. Therefore, in the present invention, a continuous fiber may be used or a discontinuous fiber may be used according to the purpose.

When the discontinuous fiber is used, it is possible to increase the buckling stress of the fastening rod as the average fiber length of the reinforcing fibers becomes longer.

However, when the average fiber length is too long, flowability of the fastening rod at the time of performing the molding and the caulking tend to be decreased.

Therefore, the average fiber length is preferably in a range of 0.01 mm to 10 mm, is more preferably in a range of 0.01 mm to 5 mm, and is even more preferably in a range of 0.03 mm to 3 mm.

In the present invention, reinforcing fibers of which fiber lengths are different from each other may be used in combination. In other words, the reinforcing fibers used in the present invention may have a single peak in the average fiber length, or may have a plurality of peaks thereof.

Furthermore, the average fiber length of the reinforcing fibers included in a fastening rod X may be calculated by a weight average fiber length.

(Fiber Diameter of Reinforcing Fiber)

The fiber diameter of the reinforcing fibers used in the present invention may be suitably determined according to the type of the reinforcing fibers, and is not particularly limited.

When a carbon fiber is used as the reinforcing fiber, in general, the average fiber diameter is preferably in a range of 3 μm to 50 μm, is more preferably in a range of 4 μm to 12 μm, and is even more preferably in a range of 5 μm to 8 μm. When a glass fiber is used as the reinforcing fiber, in general, the average fiber diameter is preferably in a range of 3 μm to 30 μm.

Here, the average fiber diameter described above indicates the diameter of a single yarn of the reinforcing fibers. Therefore, when the reinforcing fibers are in a fiber bundle form, the average fiber diameter described above indicates not the diameter of the fiber bundle but the diameter of the reinforcing fiber (the single yarn) constituting the fiber bundle. The average fiber diameter of the reinforcing fibers, for example, can be measured by a method disclosed in JIS R 7607:2000.

(Thermoplastic Resin Included in Fastening Rod)

The thermoplastic resin included in the fastening rod is not particularly limited, and is may be suitably selected according to the usage of the joined body or the like and be used. However, the matrix in the present invention may include, in combination, the thermoplastic resin as a main component and a thermosetting resin in a range where the ultrasonic waves can be applied.

The thermoplastic resin is not particularly limited, and a thermoplastic resin having a desired softening point or melting point may be suitably selected and used while considering excellent mechanical properties, productivity, and the like according to the usage of the joined body of the present invention, or the like. As the thermoplastic resin described above, in general, a thermoplastic resin having a softening point in a range of 180° C. to 350° C. is used, but the thermoplastic resin is not limited thereto.

As the thermoplastic resin of the present invention, for example, a polyolefin resin, a polystyrene resin, a thermoplastic polyamide resin, a polyester resin, a polyacetal resin (a polyoxy methylene resin), a polycarbonate resin, a (meth) acryl resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluorine-based resin, a thermoplastic polybenzimidazole resin, and the like may be exemplified.

As the polyolefin resin described above, for example, a polyethylene resin, a polypropylene resin, a polybutadiene resin, a polymethyl pentene resin, a vinyl chloride resin, a vinylidene chloride resin, a vinyl acetate resin, a polyvinyl alcohol resin, and the like may be included.

As the polystyrene resin described above, for example, a polystyrene resin, an acrylonitrile-styrene resin (an AS resin), an acrylonitrile-butadiene-styrene resin (an ABS resin), and the like may be included.

As the polyamide resin described above, for example, a polyamide 6 resin (Nylon 6), a polyamide 11 resin (Nylon 11), a polyamide 12 resin (Nylon 12), a polyamide 46 resin (Nylon 46), a polyamide 66 resin (Nylon 66), a polyamide 610 resin (Nylon 610), and the like may be included.

As the polyester resin described above, for example, a polyethylene terephthalate resin, a polyethylene naphthalate resin, a polybutylene terephthalate resin, a polytrimethylene terephthalate resin, liquid crystal polyester, and the like may be included.

As the (meth)acryl resin described above, for example, polymethyl methacrylate may be included.

As the modified polyphenylene ether resin described above, for example, modified polyphenylene ether, and the like may be included.

As the thermoplastic polyimide resin described above, for example, thermoplastic polyimide, a polyamide imide resin, a polyether imide resin, and the like may be included.

As the polysulfone resin described above, for example, a modified polysulfone resin, a polyether sulfone resin, and the like may be included.

As the polyether ketone resin described above, for example, a polyether ketone resin, a polyether ether ketone resin, and a polyether ketone ketone resin may be included.

As the fluorine-based resin described above, for example, polytetrafluoroethylene, and the like may be included.

Only one type of the thermoplastic resin included in the fastening rod of the present invention may be used, or two or more types thereof may be used. As an embodiment of using two or more types of the thermoplastic resin in combination, for example, an embodiment of using, in combination, thermoplastic resins of which softening points or melting points are different from each other, an embodiment of using, in combination, thermoplastic resins of which average molecular weights are different from each other, and the like may be included, but an embodiment is not limited thereto.

(Content of Thermoplastic Resin Included in Fastening Rod)

The content of the thermoplastic resin included in the fastening rod may be suitably determined according to the type of the thermoplastic resin, the type of the reinforcing fibers, and the like, and is not particularly limited.

The buckling stress of the fastening rod can increase as the content of the reinforcing fibers becomes greater and the content of the thermoplastic resin becomes smaller. However, when the content of the thermoplastic resin is too small, the flowability of the fastening rod at the time of the molding and the caulking tend to be lowered.

A preferred content of the thermoplastic resin is in a range of 3 parts by weight to 1000 parts by weight with respect to 100 parts by weight of the reinforcing fibers. The content of the thermoplastic resin is preferably 30 parts by weight to 200 parts by weight, is more preferably 30 parts by weight to 150 parts by weight, and is even more preferably 35 parts by weight to 100 parts by weight. When the content of the thermoplastic resin is greater than or equal to 3 parts by weight with respect to 100 parts by weight of the reinforcing fiber, a dry reinforcing fiber that impregnation in a manufacturing process is insufficient decreases, and thus such content is preferable. In addition, when the content of the thermoplastic resin is less than or equal to 1000 parts by weight, the reinforcing fibers are sufficiently included, and thus the appropriate requisition of a structural material is likely to be satisfied.

Meanwhile, herein, for the sake of simplicity, a term of "weight" is used, and the term of "weight" also indicates "mass" unless otherwise specified.

(Other Additives Included in Fastening Rod)

In addition, in the fastening rod used in the present invention, additives such as various fibrous fillers of an organic fiber or an inorganic fiber, or non-fibrous fillers, a flame retardant, an UV resistant agent, a stabilizer, a release agent, a pigment, a softening agent, a plasticizing agent, and a surfactant may be included within a range not impairing the object of the present invention.

(Manufacturing Method of Fastening Rod)

A manufacturing method of the fastening rod of the present invention is not particularly limited, and as the method, for example, injection molding, extrusion molding, press molding, and the like are included.

In the case of the injection molding, a conventionally know method may be used. For example, a method where a long fiber pellet, which is a pellet obtained by adjusting a molten thermoplastic resin to be a desired viscosity so as to be impregnated into reinforcing fibers in continuous fiber form, and then by cutting is carried out, is used and a predetermined shape is obtained with an injection molding machine, a method where the reinforcing fibers and the matrix are kneaded, in advance, using a kneader or the like and the kneaded mixture is introduced into an injection molding machine, and a predetermined shaped is obtained, or the like is included.

In general, as the fiber length after the injection molding is longer, the mechanical strength of the obtained shaped product of the fiber reinforced resin is enhanced, and the joining strength at the time of being used in the caulking tends to be enhanced. A method of making the fiber length long is not particularly limited, and as the method, specifically, a method of decreasing the melt viscosity of the matrix at the time of being melted, a method of decreasing the shear rate of the kneader or the injection molding machine, and the like are included.

As another method than the above, a method of arranging, in a mold, a substrate such as a unidirectional sheet (UD sheet) in which continuous strands are aligned in parallel, a woven fabric and discontinuous fibers, introducing a thermoplastic resin therein to perform melt-impregnation or introducing a heat-melt thermoplastic resin to perform impregnation, and then performing cooling or the like is exemplified.

2. Two or More Members Yi Having Fitting Hole

The number of members Yi which is a fastening target of the present invention is not particularly limited, and a plurality of members such members Y1, Y2, Y3 . . . may be fastened by one fastening rod within a range where the fastening can be performed. That is, "i" of Yi represents the ordinal number.

In addition, the materials or the shapes of the respective members Yi may be identical or different.

The two or more members Yi ("Yi" in FIG. 2A) which is a member to be fastened of the present invention include the fitting hole ("6" in FIG. 2B).

(Fitting Hole)

The member(s) Yi used in the present invention include at least one fitting hole. The size and the shape of the fitting hole is not particularly limited insofar as the protrusion portion of the fastening rod can be inserted and caulked such that the fastening rod can be positioned therein. The fitting hole, for example, may be in the shape of a cylinder, a circular cone, a rectangular cylinder, a pyramid, a trapezoid, and the like. Among them, the shapes of a cylinder, a circular cone, a pyramid, and a trapezoid have few elements depending on a draft angle of a mold at the time of molding the member(s) Yi, and thus can be preferably used.

As an example of the shape and the size of the fitting hole, when the fastening rod is in the shape of a cylinder, the area of the fitting hole is preferably 0.9 times to 4 times, is more preferably 0.95 times to 3 times, and is even more preferably 0.98 times to 2.3 times as large as the minimum sectional area of a cross-sectional surface of the fastening rod in the length direction.

A method of obtaining the fitting hole is not particularly limited, and as the method, for example, a method of boring a hole by using a machining drill, an end mill, a water jet, and the like, a method of performing press molding with respect to the molding material of the member(s) Yi by using a mold in which a punching blade is provided in advance in a portion corresponding to the fitting hole, and the like are included.

(Shape of Member(s) Yi)

The shape of the member(s) Yi is not particularly limited, and for example, the shapes of a flat plate, a prism, a polyhedron or the like, which has a flat part and has a cross section thereof being in a shape of polygon such as quadrangle, ar ning rod into the fitting hole. e included. For example, the member illustrated in FIG. 2B is used. It is preferable that the thickness of the member(s) Yi in the vicinity of the fitting hole (the length in the Z direction in FIG. 2B) is in a range of 1 mm to 20 mm.

(Material of Member(s) Yi)

The material of the member(s) Yi which is to be fastened is not particularly limited insofar as the fitting hole is included, and for example, metal, a resin, ceramic, and the like may be included. As the metal, for example, iron, aluminum, copper, titanium, and an alloy thereof, and the like may be included. As the resin, a synthetic resin or a non-synthetic resin (a natural material polymer) is included, and as the synthetic resin, both a thermoplastic resin and a thermosetting (type) resin may be used.

As a specific example of the thermoplastic resin, the thermoplastic resins described in (Thermoplastic Resin Included in Fastening Rod) may be preferably used. As a specific example of the thermosetting resin, an epoxy resin, a phenol resin, an unsaturated polyester resin, a melamine resin, a urea resin, a curable polyimide resin, and the like may be included.

In the resins described above, as a reinforcing fiber, an inorganic fiber such as a glass fiber and a carbon fiber, an organic fiber such as an aramid fiber, a polyester fiber, and a polyamide fiber may be included.

In the present invention, in particular, from a viewpoint of a balance between mechanical properties and lightweight properties, and electric corrosion, and the like, it is preferable that the member(s) Yi includes the same reinforcing fibers and the same thermoplastic resin as those included in the fastening rod. Therefore, it is preferable that the member(s) Yi is a carbon fiber reinforced thermoplastic resin member. The fiber length of the reinforcing fibers included in the member(s) Yi and the volume ratio of the carbon fibers may be identical to or different from those included in the fastening rod.

(Carbon Fiber)

When the reinforcing fibers included in the member(s) Yi is a carbon fiber, the carbon fiber is not particularly limited, and specifically, a PAN-based carbon fiber, and a pitch-based carbon fiber may be included. Among them, the PAN-based carbon fiber has light weight, and thus may be preferably used for reducing the weight of the structural material. Furthermore, the carbon fiber may be used alone, or two or more types of the carbon fibers may be used in combination. The form of the carbon fiber is not particularly limited, and may be a continuous fiber or a discontinuous fiber.

When the carbon fiber is the continuous fiber, the carbon fiber may be in the form of a knitted fabric or a woven fabric, or may be in the form of a so-called UD sheet in which carbon fibers are aligned in one direction to be in the shape of a sheet. In the case of the UD sheet, a stack body that a plurality of UD sheets are stacked (for example, stacked to intersect with each other in an orthogonal direction) so that fiber arrangement directions in the respective layers intersect with each other may be used. The average fiber diameter of the continuous fiber, in general, is suitably 5 μm to 20 μm.

In addition, in the case of the discontinuous carbon fiber, the carbon fiber may be in any one of a state of being aligned in a specific direction of the matrix, a state of being two-dimensionally and randomly dispersed in the plane, and a state of being three-dimensionally and randomly dispersed. As the carbon fiber, a carbon fiber having an average fiber diameter of 5 μm to 20 μm and an average fiber length of 1 mm to 100 mm may be used.

When the carbon fibers are discontinuous and are randomly dispersed in a two-dimensional direction (xy directions in FIG. 2B), the carbon fiber may be formed in the shape of a sheet by being subjected to wet papermaking, or may be arranged such that the discontinuous carbon fibers are dispersed and overlapped. In this case, the average fiber diameter is 5 μm to 20 μm, and the average fiber length is preferably 1 mm to 100 mm, is more preferably 3 nm to 100 nm, and is even more preferably 5 mm to 50 mm. When the average fiber length is less than 1 mm, a function as the carbon fiber is not sufficiently performed, and thus sufficient joining strength may not be obtained. On the other hand, when the average fiber length is greater than 100 mm, the flowability at the time of the molding is low, and thus a desired member(s) Yi may not be obtained.

In the present invention, the carbon fiber may be a three-dimensional isotropic carbon fiber mat in which long axis directions of the carbon fibers are randomly dispersed in each direction of xyz (FIG. 2B) by, for example, entangling carbon fibers into the shape of cotton. However, a mat (hereinafter, referred to as a random mat) in which the carbon fibers having an average fiber length in the range described above are substantially two-dimensionally and randomly oriented is preferable. Here, being substantially two-dimensionally and randomly oriented indicates a state in which the carbon fibers are not aligned in a specific direction such as one direction in an in-plane direction (the xy directions in FIG. 2B) of the members Yi but are randomly oriented, and are arranged in the plane of the sheet without expressing specific directional properties as a whole. The member(s) Yi obtained by using this random mat is a substantially isotropic material without having anisotropy in the plane.

In the random mat described above, all or approximately all of the carbon fibers may be in a state of being opened to a single yarn form, and an isotropic random mat is particularly preferable in which a fiber bundle having single yarns of greater than or equal to a specific number which are collected, and a single yarn or a fiber bundle in a state close thereto are mixed at a predetermined ratio. Such an isotropic random mat and a manufacturing method thereof are specifically disclosed in Pamphlet of International Publication No. 2012/105080 and JP-A-2013-49298.

A preferred random mat is an isotropic random mat in which a carbon fiber bundle (A) including carbon fibers of greater than or equal to a critical number of single fiber defined in Expression (a) described below and a carbon fiber bundle (B1) including carbon fibers of less than the critical number of single fiber and/or a carbon single yarn (B2) are mixed, and a ratio of the carbon fiber bundle (A) to the total amount of fibers in the isotropic random mat is 20 Vol % to 99 Vol % and is preferably 30 Vol % to 90 Vol %, and the average number of fibers (N) in the carbon fiber bundle (A) described above satisfies Expression (b) described below.

Critical Number of Single Fiber=$600/D$ (a)

$0.6\times10^4/D^2 < N < 1\times10^5/D^2$ (b)

(Here, D represents the average fiber diameter (μm) of the single carbon fiber.)

When the average number of fibers (N) in the carbon fiber bundle (A) is less than or equal to $0.6\times10^4/D^2$, it is difficult to obtain a high carbon fiber volume fraction (Vf), and it is difficult to obtain the member(s) Yi having excellent strength. In addition, when the average number of fibers (N) in the carbon fiber bundle (A) is greater than or equal to $1\times10^5/D^2$, a locally thick portion is generated, and thus a void is easily formed.

(Average Fiber Length of Carbon Fiber Included in Member(s) Yi)

The length of the carbon fiber included in the member(s) Yi is indicated by the average fiber length of the carbon fibers in the joined body after the fastening. As a measuring method of the average fiber length, for example, a method is adopted in which the fiber length of randomly extracted 100 fibers is measured by a caliper or the like down to the unit of 1 mm, and thus the average thereof is obtained. A preferred average fiber length of the carbon fiber is 3 mm to 100 mm. The random mat may be constituted by a carbon fiber having a single fiber length, or may be mixed with a carbon fiber having a different fiber length.

Furthermore, it is preferable that the average fiber length is measured by a weight average fiber length.

(Example of Manufacturing Method of Member(s) Yi)

When the thermoplastic resin is used for the member(s) Yi of the present invention, as a specific manufacturing example, injection molding, extrusion molding, press molding, and the like are included. In a case of the press molding, a hot air drier, an infrared ray heater, and the like are used. In addition, in order to manufacture the member(s) Yi by using the press molding, for example, the UD sheet in which continuous fibers are arranged in one direction or a papermaking sheet formed of a discontinuous fiber, the random mat described above, and the like are used as a single layer or a plurality of layers thereof is layered, they are heated and pressed in a state of including the thermoplastic resin, the thermoplastic resin in these sheets or the mat is melted and impregnated between the fibers to manufacture the member(s) Yi including the thermoplastic resin as the matrix.

(Other Agents Included in Member(s) Yi)

In addition, in the member(s) Yi used in the present invention, additives such as various fibrous fillers of an organic fiber or an inorganic fiber or non-fibrous fillers, a flame retardant, a UV resistant agent, a stabilizer, a release agent, a pigment, a softening agent, a plasticizing agent, and a surfactant may be included within a range not impairing the object of the present invention.

3. Joined Body

The joined body of the present invention is a joined body in which the two or more members Yi including the fitting hole are fastened, the fastening rod including the reinforcing fibers and the thermoplastic resin is positioned in the fitting hole, and the ultrasonic waves are applied to the fastening rod, so that the members Yi are caulking-fastened (FIG. 3 and FIG. 4). The number of members Yi which is the member to be fastened may be greater than or equal to 2, and 3 or 4 or more members may be concurrently caulking-fastened by inserting the faste In FIG. 3A, a schematic view is illustrated in which the ultrasonic waves are applied by using a horn ("7" in FIG. 3A) to the protrusion portion. By applying the ultrasonic waves to the fastening rod, the thermoplastic resin of the protrusion portion is melted and caulked according to the shape of the horn as illustrated in FIG. 3B. The shape after the caulking may be determined according to the shape of the horn ("7" in FIG. 3A) used in the caulking, and thus the horn may be suitably designed according to a desired shape.

In addition, a joined body in which the fastening rod is in the shape of a rivet including a head part, and the end portion at the side opposite to the head part is caulked may be adopted, and as illustrated in FIG. 4, both sides may be caulked by caulking each one side. That is, an upper side is caulked by initially applying the ultrasonic waves from the upper side of the plane of paper of FIG. 4, and then, similarly, the ultrasonic waves are applied from the lower side of the plane of paper of FIG. 4, and thus the both sides can be caulked.

(Joining Strength)

It is preferable that the cross tension strength of the joined body of the present invention is greater than or equal to 3 kN. When the cross tension strength exceeds 1 kN, the joined body has strength used for a structural member or the like. The cross tension strength of the joined body is more preferably greater than or equal to 4 kN, and is even more preferably greater than or equal to 6 kN. In the present invention, the fastening rod is caulked and the members Yi are fastened, and thus the joined body has excellent joining strength. However, depending on the usage, the fastened portion may be further reinforced by using other joining methods, for example, an adhesive agent or the like.

4. Fastening Rod Including Protrusion, and Intermediate and Joined Body Used Therein Hereinafter, a case where the fastening rod including the protrusion is used will be described, in the section of "4. Fastening Rod Including Protrusion", when it is simply referred to as a "fastening rod", the "fastening rod" indicates a fastening rod including one or more protrusions unless otherwise specified. In addition, all fastening rods 11, 121, 141, and 151 including a protrusion is an example of the fastening rod described in the sections "1. to 3.".

In addition, when the joined body using the fastening rod including the protrusion is described, for specifying the "two or more members Yi", the members Yi may be referred to as a first member and a second member, and both of the first member and the second member are an example of the members Yi. Hereinafter, in the section of "4. Fastening Rod Including Protrusion", two or more members Yi are described as a member including the first member and the second member.

4.1 Another Object of Present Invention

In a case where the resin rivet disclosed in Patent Document 1 described above is caulked and fastened, when an intermediate body in which the resin rivet and at least one member to be fastened are engaged is moved, transported, or distributed, the resin rivet is usually detached in midstream, and thus the distributability as the intermediate body becomes insufficient. Therefore, a second object of the present invention is to provide an intermediate body having excellent distrubutability and a joined body using the intermediate body.

In addition, as a third object, in the caulking method described above, a pressing load is exerted to the body part of the resin rivet, and thus it is necessary to support the head part side of the resin rivet by a support member. In this case, at the time of performing the caulking and fastening, it is difficult to position the resin rivet and the support member, and it is not possible to use the resin rivet in a working environment in which a space for the support member cannot be ensured. Therefore, the third object of the present invention is to provide a joined body which can be fastened at the time of fastening the first member and the second member by the fastening rod even when the fastening rod is not supported or is comparatively weakly supported, an intermediate body for a joined body, and a fastening rod.

4.2 Effect of Invention when Fastening Rod Including Protrusion is Used

In the joined body of the present invention, the fastening rod including the thermoplastic resin is caulked by heat. For this reason, a pressing load which is exerted to the fastening rod at the time of the fastening is low compared to a case where, for example, the body part is plastically deformed into the shape of a curl and is caulked without applying the ultrasonic waves.

When the fastening rod includes the protrusion, the fastening rod is not likely to be detached at the time of being moved or worked in a state where the fastening rod is engaged (temporarily fixed) to the members Yi, the pressing load to the fastening rod at the time of the fastening is low since the fastening rod is caulked by heat, and thus even when the support member supporting the fastening rod is not included or the fastening rod is comparatively weakly supported, the other end portion can be caulked. Furthermore, the other end portion will be described below.

4.3 Solution for Another Object of Present Invention (Embodiment for Carrying out Invention Using Fastening Rod Including Protrusion)

4.3.1 Joined Body Using Fastening Rod Including Protrusion

In the joined body, in a state where one end portion of the fastening rod passing through a first fitting hole of the first member and a second fitting hole of the second member is positioned at the first member side, the other end portion of the fastening rod is caulked, and the first member and the second member are fastened.

The joined body includes the first member and the second member. That is, the joined body includes a joined body in which the first member and the second member are fastened by the fastening rod, and a joined body in which the first member, the second member, and one or more other members in addition to the first member and the second member are fastened by the fastening rod. Hereinafter, the other member in addition to the first member and the second member will be described as "other member". The "other member" is one of the member(s) Yi described above.

The "one end portion" of the fastening rod indicates a portion including one end of the fastening rod, and the "one end" is an end at a side close to the first member of the joined body. The "other end portion" of the fastening rod indicates a portion including the other end at the side opposite to the one end portion. Therefore, when the resin rivet is used, the head part described above corresponds to the "one end portion", and the end portion at the side opposite to the head part corresponds to the "other end portion".

Furthermore, a side at which the first member constituting the joined body is positioned is the "one end", and a side at which the member(s) Yi is positioned to be most separated from the first member is the "other end".

When the joined body is constituted by the first member, the second member, and the fastening rod, the other end portion of the fastening rod is positioned at the second member side.

When the other member is included in the joined body using the fastening rod including the protrusion, a layering order of the members Yi may be an order of the first member, the second member, and the other member, or may be an order of the first member, the other member (one or a plurality of members), the second member, and the other member (one or a plurality of members). In this case, the other end portion of the fastening rod is positioned at the other member side. Furthermore, the second member is fastened to the first member by fastening the first member and the other member by the fastening rod. When the other member is included in the joined body, the layering order of the members Yi may be an order of the first member, the other member, and the second member. In this case, the other end portion of the fastening rod is positioned at the second member side.

However, all of the members Yi include the fitting hole so that the fitting hole configures one through hole at the time of the fastening. Furthermore, the fitting hole of the first member is the first fitting hole, and the fitting hole of the second member is the second fitting hole. Obviously, the other member also includes a fitting hole.

The other end portion of the fastening rod including the protrusion is caulked by heat in a state where the one end portion is positioned at the first member side.

Here, the "state where the one end portion is positioned at the first member side" may be a state where the one end portion is positioned at the outer side of the first member (at the side opposite to the second member) or a state where a part or all of the one end portion is positioned in the first fitting hole of the first member. In each of the cases, the one end portion of the fastener may be in contact with the first member in design, or may be separated from the first member in design.

The other end portion of the fastening rod is a portion (referred to a protrusion portion) protruding to the side opposite to the one end of the fastening rod from the fitting hole of the member at the outermost side opposite to the first member in the joined body, and a part of all of the protrusion portion is caulked by heat.

4.3.2 Fastening Rod Including Protrusion

The fastening rod including the protrusion includes reinforcing fibers and a thermoplastic resin. Specifically, it is preferable that the thermoplastic resin is a matrix, and the reinforcing fibers are included in the matrix.

The fastening rod including the protrusion is a rod for fastening at least the first member and the second member, and is used for fastening at least the first member and the second member. Here, as described above, the fastening rod may be used for fastening the first member and the second member, or for fastening the first member, the second member, and the other member.

Hereinafter, in the section of "4. Fastening Rod Including Protrusion, and Intermediate and Joined Body Used Therein", the "fastening rod including the protrusion" is caulked by heat to fasten the first member and the second member, or the other member depending on case, so that the "fastening rod including protrusion" becomes a "fastener".

Here, the one end portion of the fastener indicates a portion including the one end of the fastener, and the "one end" indicates an end at the same side as the "one end" of the one end portion of the fastening rod. The other end portion of the fastener indicates a portion including the other end of the fastener, and the "other end" indicates an end at the same side as the "other end" of the other end portion of the fastening rod.

In the case of the shape of a rivet or the like, the one end portion of the fastening rod has a configuration in which the one end portion cannot pass through the first fitting hole at the time of caulking the other end portion by heat. However, in a state before the other end portion is caulked by heat, the one end portion of the fastening rod may have a configuration in which the one end portion can pass through the first fitting hole.

Hereinafter, the configuration of the fastening rod at the time of thermally caulking the other end portion will be described.

The fastening rod including the protrusion includes the one end portion having a configuration in which the one end portion cannot pass through the first fitting hole. This configuration is attained by bringing at least a part of the one end portion into contact with the first member when the one end portion passes through the first fitting hole. That is, the fastening rod may include the head part which is in contact with the first member in the one end portion.

When the head part which is in contact with the first member is not included in the fastening rod including the protrusion, the head part can be disposed in the one end portion by thermally caulking the one end portion before the joined body is formed. Hereinafter, in the section of "4. Fastening Rod Including Protrusion, and Intermediate and Joined Body Used Therein", the head part of the fastening rod indicates both of a head part disposed before being inserted into the members Yi and a head part disposed by thermally caulking the one end portion of the fastening rod before the joined body is formed. That is, the head part may be disposed in the one end portion by concurrently thermally caulking the other end portion and the one end portion.

Hereinafter, as the fastening rod including the protrusion and the head part, a fastening rod including a body part other than the head part, for example, in a rivet shape will be described.

Figure 6A:
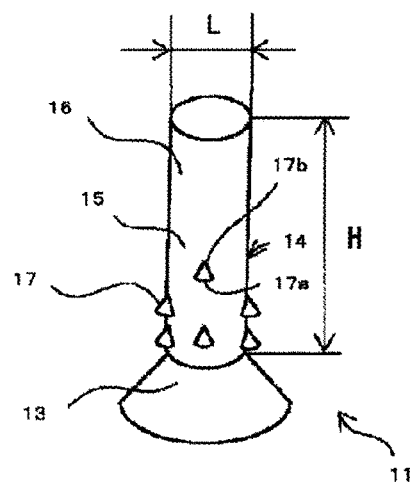
FIG. 6A is a perspective view as an example of the fastening rod.

For example, in a fastening rod 11 illustrated in FIG. 6A, a reference numeral "13" is the head part, and a reference numeral "14" is the body part. In a fastening rod 121 illustrated in FIG. 7A, a reference numeral "123" is the head part, and a reference numeral "124" is the body part. In a fastening rod 141 illustrated in FIG. 8A, a reference numeral "143" is the head part, and a reference numeral "144" is the body part. In a fastening rod 151 illustrated in FIG. 8B, a reference numeral "153" is the head part, and a reference numeral "154" is the body part.

In the body parts 14, 124, 144, and 154, protrusion portions 16, 126, 146, and 156 protruding to a side opposite to the head parts 13, 123, 143, and 153 from the fitting hole (here, the second fitting hole) of the member Yi (here, the second member) which is positioned at the other end side of the joined body corresponds to the other end portion. In addition, in the fastening rods 11, 121, 141, and 151, portions between the head parts 13, 123, 143, and 153 and the other end portions 16, 126, 146, and 156 are middle parts 15, 125, 145, and 155, respectively.

The fastening rods 11, 121, 141, and 151 include one or more protrusions 17, 127, 147, and 157 which are engaged with at least one fitting hole of the first fitting hole and the second fitting hole in a state where the head parts 13, 123, 143, and 153 are positioned on the first member side.

Here, an extension direction of the fastening rods 11, 121, 141, and 151 indicates a "central axis direction", a direction passing through the center in the plane which is orthogonal to the central axis indicates a "diameter direction", and a direction orthogonal to the diameter direction in the plane which is orthogonal to the central axis (in other words, a rotation direction of which the rotation center is the central axis) indicates a "circumference direction".

Thus, as an example of the present invention, the fastening rod including the protrusion includes the head part, the body part, and the protrusion portion. The total length of the head part and the body part is not particularly limited, and in general, is 6 mm to 70 mm. In the body part, the length of the protrusion portion protruding to the side opposite to the head part from the fitting hole (here, the second fitting hole) of the member Yi (here, the second member) which is positioned on the other end side of the joined body is not particularly limited insofar as the protrusion portion can be caulked by heat, and also depends on the thickness or the number of members to be fastened Yi (the second member or the other member), but it is preferable to set the length of the protrusion portion to be in a range of 3 mm to 50 mm from a viewpoint of expressing sufficient strength due to the caulking.

4.3.2.1. One End Portion (Head Part)

The head part of the fastening rod including the protrusion described below indicates a state of the one end portion at the time of thermally caulking the other end portion. The head parts 13, 123, 143, and 153 have a configuration in which the head parts are or can be in contact with the first member. In order to be or to be able to be in contact with the first member, in a relationship with respect to the middle part 15, 125, 145, and 155, it is necessary that the size of the cross-sectional surface of the head parts 13, 123, 143, and 153 in the diameter direction is greater than the size of the cross-sectional surface of the middle parts 15, 125, 145, and 155 in the diameter direction, and the shape, the size, or the like of the head parts 13, 123, 143, and 153 is not particularly limited.

The head parts 13, 123, 143, and 153, for example, may have a shape as illustrated in FIG. 6A, FIG. 7A, FIG. 8A, and FIG. 8B.

As illustrated in FIG. 6A, the head part 13 is a countersunk head in the shape of a circular truncated cone, and the cross-sectional surface may be in the shape of a truncated cone of an elongated circle, an ellipse, and a polygon such as a triangle or a quadrangle. In addition, in FIG. 6A, the head part 13 is solid, but the head part may be hollow.

Figure 7A:
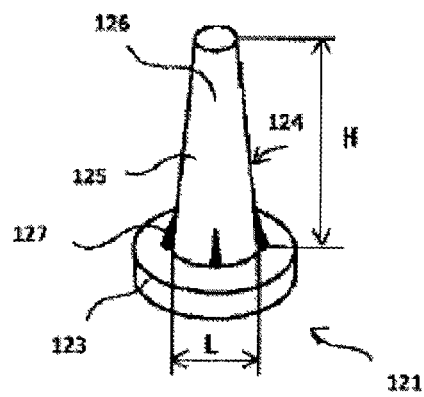
FIG. 7A is a perspective view as an example of the fastening rod.

As illustrated in FIG. 7A, the head part 123 is a cylindrical flat head, and the cross-sectional surface may be in the shape of a column of an elongated circle, an ellipse, and a polygon such as a triangle or a quadrangle. In addition, in FIG. 7A, the head part 123 is in the shape of a column, but the head part may be in the shape of a hollow cylinder.

Figure 8A:
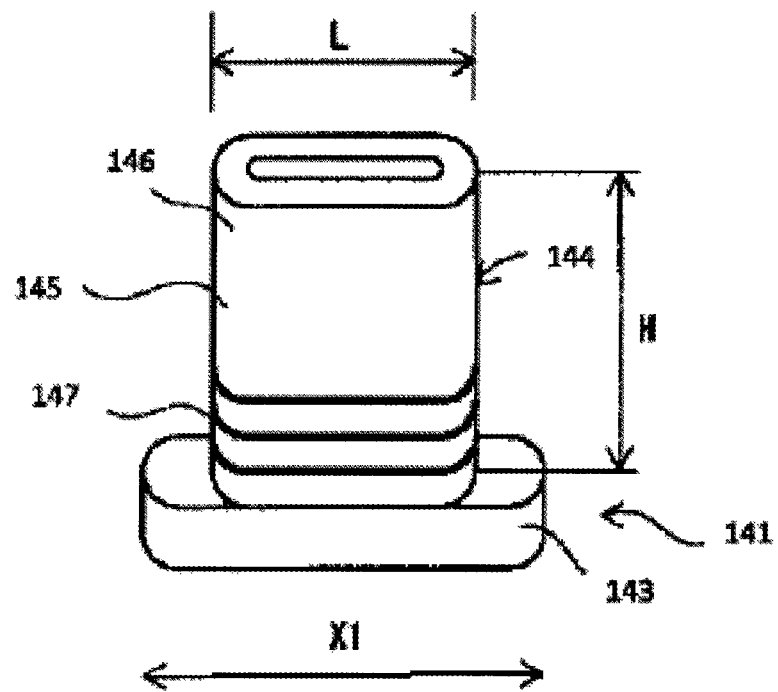
FIGS. 8A and 8B are perspective views illustrating a modification example of the fastening rod.
Figure 8B:
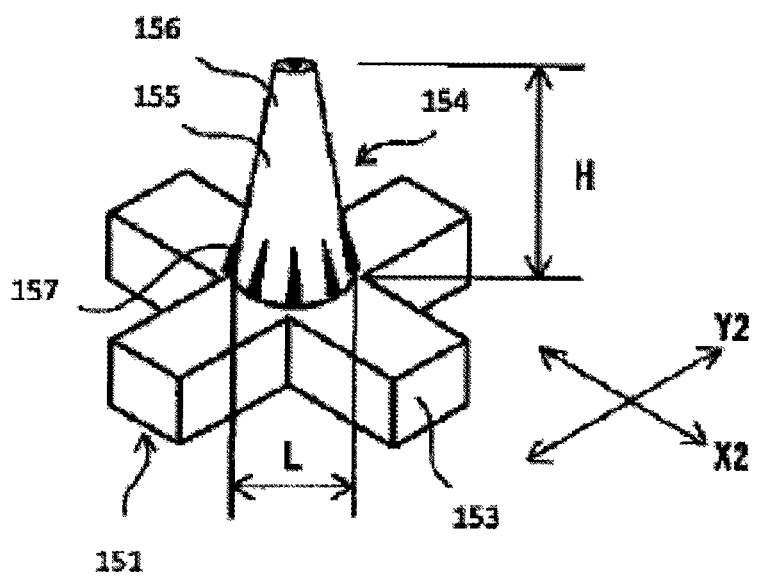

The head parts 143 and 153 may not be in the shape of a rotating body which is formed by rotating a predetermined line as illustrated in FIG. 6A or FIG. 7A around the central axis, and for example, may has a "−" shape in a plan view as illustrated in FIG. 8A, or may has a "+" shape in a plan view as illustrated in FIG. 8B.

The head part may be a round head (not illustrated) in the shape of a half-sphere. In this case, the head part may be solid, or may be hollow.

As described above, the head parts 13, 123, 143, and 153 has the cross-sectional surface in the diameter direction larger than that of the middle parts 15, 125, 145, and 155. A portion having a large size may be positioned over the entire circumference of the head parts 13 and 123 as illustrated in FIG. 6A or FIG. 7A, or may be positioned in a part of the head parts 143 and 153 as illustrated in FIGS. 8A and 8B.

That is, at least a part of the head parts 13, 123, 143, and 153 is greater than the middle parts 15, 125, 145, and 155. In other words, in the cross-sectional surface, a distance from the center in a portion which is most separated in the diameter direction from the center of the head parts 13, 123, 143, and 153 only have to be greater than a distance from the center in a portion which is most separated in the diameter direction from the center of the middle parts 15, 125, 145, and 155.

It is preferable that the maximum area of the cross-sectional surface of the head parts 13, 123, 143, and 153 is larger than the opening area (hereinafter, simply referred to as the area) of the cross-sectional surface of the first fitting hole of the first member. When the maximum area of the head parts 13, 123, 143, and 153 is larger than or equal to the opening area of the first fitting hole, the head parts 13, 123, 143, and 153 can be in contact with the first member. Accordingly, when the fastening rods 11, 121, 141, and 151 are caulked, it is possible to manufacture the joined body by caulking only the other end side.

As illustrated in FIG. 8A or FIG. 8B, when the head parts 143 and 153 are not in the shape of a rotating body, but the opening shape of the cross-sectional surface of the first fitting hole is identical to the cross-sectional shape of the head parts 143 and 153, it is possible to bring the head parts 143 and 153 into contact with the first member by slightly rotating the fastening rods 141 and 151 around the central axis even when the area of the cross-sectional surface of the head parts 143 and 153 is less than the area of the cross-sectional surface of the first fitting hole.

That is, in a relationship with respect to the first fitting hole of the first member, the head parts 13, 123, 143, and 153 only have to include a portion in which the size of the cross-sectional surface in the diameter direction (the X1 direction in FIG. 8A or the X2 and Y2 directions in FIG. 8B) is larger than the first fitting hole in the other direction (a direction other than X1, X2, and Y2 directions).

It is preferable that the area of the cross-sectional surface of the head parts 13, 123, 143, and 153 is 1.1 times to 5 times as large as the minimum opening area of the cross-sectional surface of the first fitting hole. Accordingly, it is possible to reliably prevent the head parts 13, 123, 143, and 153 from passing through the first fitting hole of the first member.

4.3.2.2. Middle Parts

The middle parts 15, 125, 145, and 155 are portions positioned in the first fitting hole and the second fitting hole (refer to FIG. 7C), in the second fitting hole (refer to FIG. 6C), or in the fitting hole of the other member at the time of including the other member.

The middle parts 15, 125, 145, and 155 only have to have a configuration in which the middle parts can pass through the fitting hole of the other member at the time of including at least the second fitting hole of the second member and the other member, and the shape, the size, or the like of the intermediate parts 15, 125, 145, and 155 is not particularly limited.

Figure 6B:
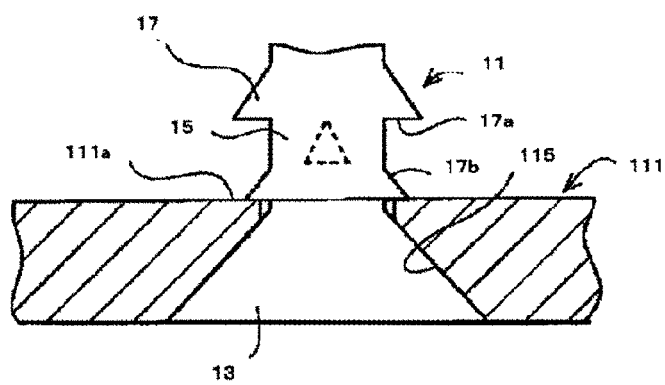
FIG. 6B is a sectional view illustrating a state in which the fastening rod is inserted into a first member.
Figure 6C:
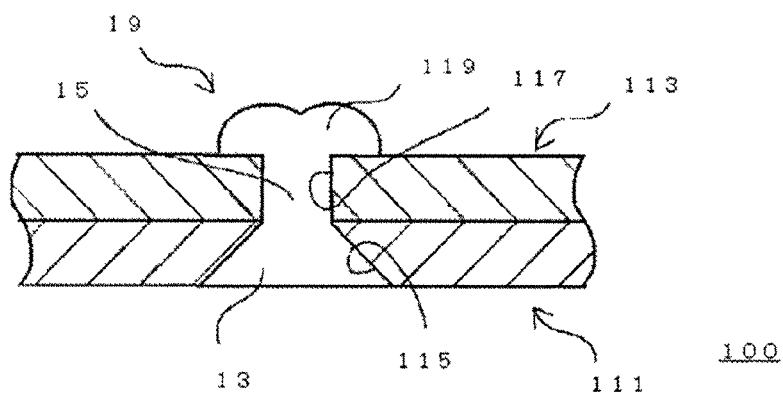
FIG. 6C is a sectional view illustrating the joined body using the fastening rod.

As an example of the middle part passing through the second fitting hole of the second member, or the second fitting hole of the second member and the fitting hole of the other member, for example, the middle part 15 as illustrated in FIG. 6C is included.

The middle parts 15, 125, 145, and 155, for example, may have a shape as illustrated in FIG. 6A, FIG. 7A, and FIG. 8A.

The cross-sectional surface of the middle parts 15 and 125 may be in the shape of a circle as illustrated in FIG. 6A or FIG. 7A, the cross-sectional surface of the middle part 145 may be in the shape of an elongated circle as illustrated in FIG. 8A, and the cross-sectional may be in the shape of an ellipse, or a polygon such as a triangle or a quadrangle. The middle parts 15 and 125 may be solid as illustrated in FIG. 6A or FIG. 7A, or the middle parts 145 and 155 may be a hollow cylinder as illustrated in FIG. 8A or FIG. 8B.

The middle parts 125 and 155 may have a shape which is gradually narrowed in the central axis direction as being separated from the head parts 123 and 153 as illustrated in FIG. 7A or FIG. 8B, or the middle parts 15 and 145 may have a constant thickness regardless of the position in the central axis direction as illustrated in FIG. 6A or FIG. 8A.

As illustrated in FIG. 8B, the cross-sectional shape of the middle part 155 may be different from the cross-sectional shape of the head part 153. Furthermore, it is preferable that the cross-sectional surface of the middle part is in the shape of a circle in consideration of the isotropy at the time of performing the caulking by using heat.

The other end portions 16, 126, 146, and 156 of the body parts 14, 124, 144, and 154 at the side opposite to the head parts 13, 123, 143, and 153 correspond to a region to be caulked, which is caulked by heat at the time of fastening the first member and the second member or at the time of fastening the first member, the second member and the other member. This region to be caulked is regulated by the thickness of the members Yi to be fastened and the size of the caulking portion (specifically, a volume, and the diameter or the height of the caulking portion).

As described above, length and thickness (the size of the area of the cross-sectional surface) of the body parts 14, 124, 144, and 154 and the middle part 15, 125, 145, and 155 are suitably selected according to the number of members Yi to be fastened, the thickness of the members Yi, the size of the caulking portion, a fastening force, and the like, and are not particularly regulated.

It is preferable that the length of the body parts 14, 124, 144, and 154 ("H" in FIG. 6A, FIG. 7A, FIG. 8A, and FIG. 9B) is 6 mm to 50 mm. It is preferable that the maximum size of the cross-sectional surface (for example, the length of "L" in FIG. 6A, FIG. 7A, FIG. 8A, and FIG. 9B) is 4 mm to 22.5 mm.

Furthermore, the fastening rods 11, 121, 141, and 151 include the reinforcing fiber s, and thus the buckling stress is higher than that of the fastening rod made from a resin only, and it is possible to make the body parts 14, 124, 144, and 154 long, compared to a case of the fastening rod made from a resin only.

4.3.2.3. Protrusion

The protrusions 17, 127, 147, and 157 are engaged with at least one of the first fitting hole of the first member and the second fitting hole of the second member. The protrusion included in the fastening rod of the present invention may have any shape insofar as the protrusion has a function of being not likely to be separated from at least one of the first member and the second member by being engaged with at least one of the first fitting hole and the second fitting hole.

Furthermore, the engagement mode is not particularly limited. For example, as illustrated in FIG. 6B, the protrusion 17 may be engaged to be hooked by the circumferential edge (a principal surface 111*a* on the other end side) of a first fitting hole 115 of a first member 111. Obviously, the protrusion 17 illustrated in FIG. 6A may be in the position of the protrusion 127 illustrated in FIG. 7A.

Figure 7C:
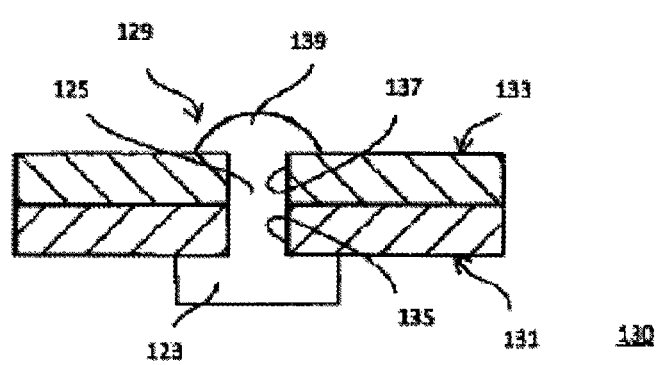
FIG. 7C is a sectional view illustrating the joined body using the fastening rod.
Figure 7B:
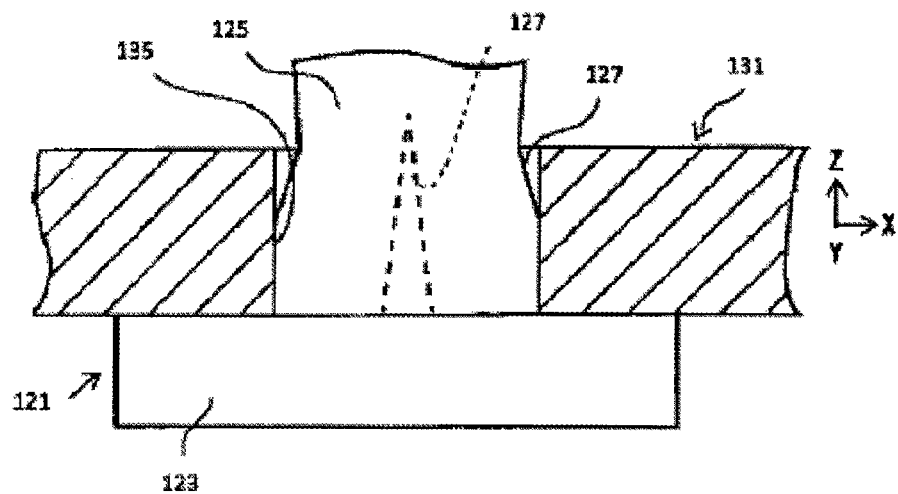
FIG. 7B is a sectional view illustrating a state in which the fastening rod is inserted into the first member.

For example, as illustrated in FIG. 7B, the protrusion 127 may be engaged to press an inner circumferential surface of a first fitting hole 135 of a first member 131. Obviously, the protrusion 127 illustrated in FIG. 7A may be formed over the head part 13 and the middle part 15 illustrated in FIG. 6A.

In the example described above, all of the protrusions 17, 127, 147, and 157 are engaged only to the first fitting holes 115 and 135. However, the protrusions 17, 127, 147, and 157 may be engaged only to second fitting holes 117 and 137, or may be engaged with the first fitting holes 115 and 135 and the second fitting holes 117 and 137, and when the other member is included, the protrusions 17, 127, 147, and 157 may be engaged with the fitting hole of the other member in addition to the second fitting hole.

That is, in a case of a joined body in which a plurality of members Yi are fastened by a fastening rod passing through each fitting hole of the plurality of members Yi, the fastening rod may include a protrusion which is engaged with a fitting hole of at least one member Yi among the plurality of members Yi. However, from a viewpoint of transportation at the time of the manufacturing, it is preferable that protrusions 17, 127, 147, and 157 are engaged with the first fitting holes 115 and 135.

When only the first member and the second member are included, and the other member is not included, the joined body can be manufactured without any particular limitation insofar as the protrusion is engaged with at least one of the first fitting hole and the second fitting hole, and it is preferable that the protrusion is engaged with at least the first fitting hole.

In addition, when the other member in addition to the first member and the second member is included in the order of "the other member, the first member, and the second member", the joined body can be manufactured without any particular limitation insofar as the protrusion is engaged with at least one of the first fitting hole and the second fitting hole, and it is preferable that the protrusion is engaged with at least the first fitting hole.

When the other member in addition to the first member and the second member is included in the order of "the first member, the other member, and the second member" or in the order of "the first member, the second member, and the other member", the joined body can be manufactured without any particular limitation insofar as the protrusion is engaged with at least one of the first fitting hole and the second fitting hole.

The protrusions 17, 127, 147, and 157 may be engaged with at least one of the first fitting hole and the second fitting hole, and the forming position thereof is not particularly limited. The protrusions 17, 127, 147, and 157, for example, may be in the middle part 15 as illustrated in FIG. 6A, FIG. 7A, FIG. 8A, and FIG. 8B, and the protrusion may be in the head part, or may be in the middle part and the head part.

The protrusions 17, 127, 147, and 157 may be integrally provided with the middle parts 15, 125, 145, and 155 or the head parts 13, 123, 143, and 153, or may be separate from the middle parts 15, 125, 145, and 155 or the head parts 13, 123, 143, and 153, and then may be attached thereto. As an example in which the protrusions 17, 127, 147, and 157 are integrally provided, a case is included in which the fastening rod is obtained by injection molding or press molding. As an example in which the protrusions 17, 127, 147, and 157 are separate, a case is included in which the protrusion is adhered by using a adhesive agent or is adhered by melting a thermoplastic resin identical to the thermoplastic resin constituting the protrusion, the middle part, or the head part. Alternatively, the protrusion may be formed of a thermoplastic resin other than the thermoplastic resin described above, or a thermosetting resin. Further, the protrusion may be formed of an elastic body such as rubber.

The protrusions 17, 127, 147, and 157 may be engaged with at least one of the first fitting hole and the second fitting hole, and the shape thereof is not particularly limited. For example, the protrusion 17 may be in the shape of a knob-like as illustrated in FIG. 6A, the protrusions 127 and 157 may be in the shape of a rib as illustrated in FIG. 7A or FIG. 7B, or the protrusion 147 may be in the shape of a ring as illustrated in FIG. 8A.

Figure 9A:
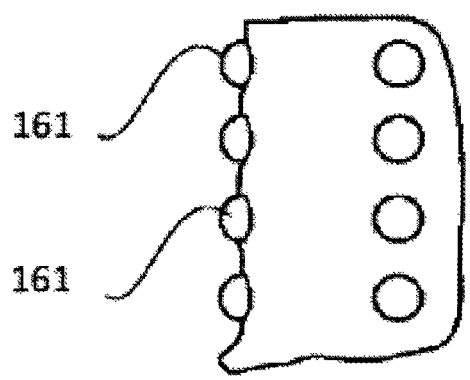
FIGS. 9A, 9B, and 9C are enlarged views illustrating a modification example of a knob-like protrusion of the fastening rod.
Figure 9B:
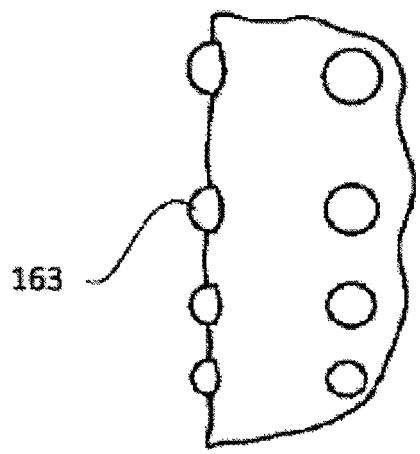

The knob-like protrusion 17 may be in the shape of a cone such as a polygonal pyramid of a triangular pyramid or the like as illustrated in FIG. 6A, or may be in the shape of a half-sphere as illustrated in FIG. 9A and FIG. 9B. Furthermore, as illustrated in FIG. 6A and FIG. 6B, in the protrusion 17, an end surface 17a at the one end side is orthogonal to the central axis, and a top portion 17b facing the end surface is at the other end side. That is, the protrusion 17 may have a shape in which a protruding size decreases as being separated from the head part 13.

Figure 9C:
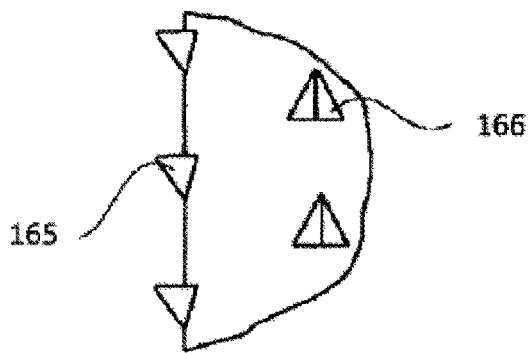

All of a plurality of protrusions 17 illustrated in FIG. 6A, a plurality of protrusions 161 illustrated in FIG. 9A, and a plurality of protrusions 165 illustrated in FIG. 9C have the same shape and the same size. However, the sizes of a plurality of protrusions 163 may be different from each other as illustrated in FIG. 9B, or a plurality of protrusions 165 and 166 may be disposed such that the positions of the end surface are different as illustrated in FIG. 9C even when the shapes of the plurality of protrusions 165 and 166 are identical to each other. As illustrated in FIG. 9B, the plurality of protrusions 163 may be enlarged as being moved from the head part to the other end portion, or may be enlarged as being moved to the head part.

As illustrated in FIG. 9B, the plurality of protrusions 163 may be disposed such that an interval between the protrusions increases as being moved to the other end portion, may be disposed such that the interval between the protrusions increases as being moved to the head part, or may be disposed such that the interval between the protrusions has irregularity.

The protrusions 17, 165, and 166 may be positioned on a plurality of lines along the central axis and may be alternately positioned on the adjacent lines of the plurality of lines in the circumference direction as illustrated in FIG. 6A or FIG. 9C, or the protrusions 161 and 163 may be positioned on the same line orthogonal to the central axis on the adjacent lines of the plurality of lines in the circumference direction as illustrated in FIG. 9(a) and FIG. 9(b).

Figure 10A:
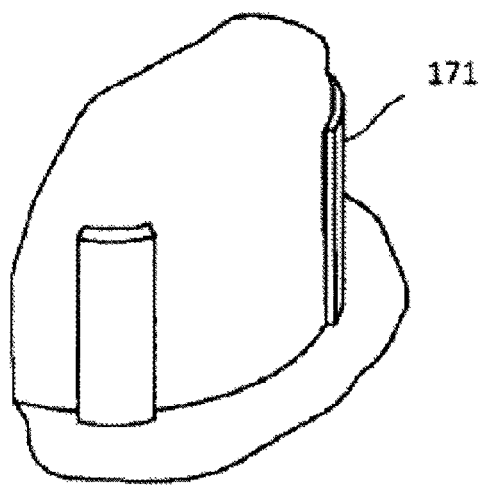
FIGS. 10A, 10B, and 10C are enlarged views illustrating a modification example of a rib-like protrusion of the fastening rod.

The cross-sectional surface of the rib-like protrusion which is orthogonal to a longitudinal direction may be in the shape of a triangle as with the protrusion 127 in FIG. 7A, may be in the shape of a rectangle as with the protrusion 171 in FIG. 10A, or may be in the shape of a semicircle.

Figure 10B:
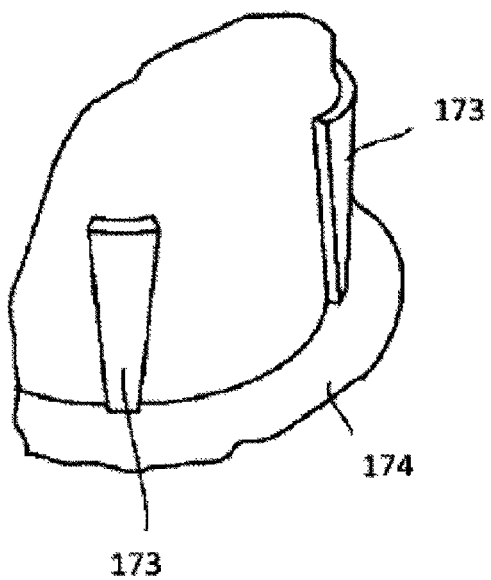

The width of the protrusion 127 may be in a tapered shape in which the width is narrowed as being separated from the head part as illustrated in FIG. 7A, may be in a shape in which the width of the protrusion 171 is constant as illustrated in FIG. 10A, or may be in a tapered shape in which the width of the protrusion 173 is narrowed as being close to the head part 174 as illustrated in FIG. 10B.

Figure 10C:
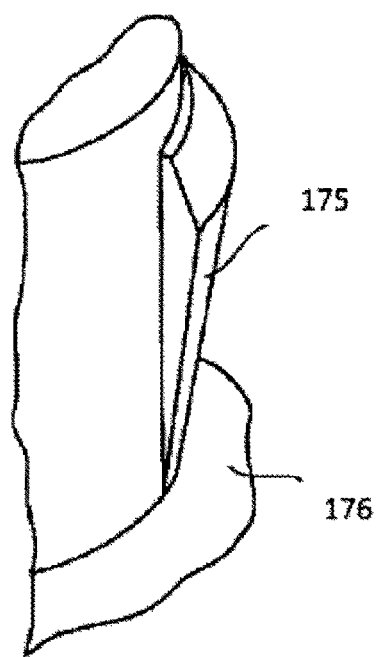

The protruding size of the protrusion may decrease as being separated from the head part 123 as with the protrusion 127 in FIG. 7A or FIG. 7B, or may be constant as with the protrusions 171 and 173 in FIG. 10A or FIG. 10B. In addition, as the protrusion 175 in FIG. 10C, the protruding size of the protrusion may initially be high (increased) as being separated from the head part 176, and then may be low (decreased), or this high and low state may be repeated.

In addition, in a case of the rib-like protrusion, a plurality of protrusions may be positioned in the central axis direction or the circumference direction, and the heights, lengths, and the widths of the plurality of protrusions may be identical or different.

In addition, the length of the rib-like protrusions 127, 157, 171, 173, and 175 in the central axis direction and the length of a region in which a plurality of knob-like protrusions 17, 161, 163, 165, and 166 are formed in the central axis direction may be shorter than, may be equal to, or may be longer than the thickness of the members Yi including the fitting hole to which the protrusion is engaged.

When the protrusion is arranged across the opening edge of the first fitting hole of the other end side of the first member, for example, as illustrated in FIG. 6B, a part of the protrusion is hooked by the first fitting hole, and thus it is possible to further prevent the fastening rod from being detached. The number of protrusions 127, 157, 171, 173, and 175 is not particularly limited insofar as the protrusion can be engaged with at least one of the first fitting hole and the second fitting hole. However, in the cross-sectional surface of a portion in which the protrusions 127, 157, 171, 173, and 175 are formed, a plurality of protrusions are disposed in a position symmetrical to the center, or the protrusions are disposed in positions of a plurality of apexes of a regular polygon, and thus the central axis of the fastening rod and the center of the first fitting hole are easily positioned.

4.3.2.4 Reinforcing Fiber Included in Fastening Rod Including Protrusion (1) Type of Reinforcing Fiber As previously described in (Reinforcing Fiber Included in Fastening Rod), the type of the reinforcing fibers included in the fastening rods 11, 121, 141, and 151 including the protrusion may be suitably selected according to the type of the matrix, the usage of the joined body, and the like, but is not particularly limited. For this reason, as the reinforcing fibers, both an inorganic fiber and an organic fiber may be preferably used.

As the inorganic fiber, for example, a carbon fiber, an activated carbon fiber, a graphite fiber, a glass fiber, a tungsten carbide fiber, a silicon carbide fiber (a silicon carbide fiber), a ceramic fiber, an alumina fiber, a natural fiber, a mineral fiber such as a basalt, a boron fiber, a boron nitride fiber, a boron carbide fiber, a metal fiber, and the like may be included.

As the metal fiber, for example, an aluminum fiber, a copper fiber, a brass fiber, a stainless steel fiber, and a steel fiber may be included. As the glass fiber, a fiber formed of E glass, C glass, S glass, D glass, T glass, a quartz glass fiber, a borosilicate glass fiber, and the like may be included. As the organic fiber, for example, a fiber formed of a resin material such as polyaramide, polyparaphenylene bezoxazole (PBO), polyphenylene sulfide, polyester, acryl, polyamide, polyolefin, polyvinyl alcohol, and polyarylate may be included.

Two or more types of the reinforcing fibers may be used in combination. In this case, a plurality of types of the inorganic fiber may be used in combination, a plurality of types of the organic fiber may be used in combination, or the inorganic fiber and the organic fiber may be used in combination. As an embodiment of using the plurality of types of the inorganic fiber in combination, for example, an embodiment of using a carbon fiber and a metal fiber in combination, an embodiment of using a carbon fiber and a glass fiber in combination, and the like may be included.

As an embodiment of using the plurality of types of the organic fiber in combination, for example, an embodiment of using an aramid fiber and a fiber formed of other organic materials in combination, and the like may be included. Further, as an embodiment of using the inorganic fiber and the organic fiber in combination, for example, an embodiment of using a carbon fiber and an aramid fiber in combination may be included.

The reinforcing fiber may be a reinforcing fiber in which a sizing agent is attached to the surface. When the reinforcing fiber to which the sizing agent is attached is used, the type of the sizing agent may be suitably selected according to the type of the reinforcing fiber and the matrix, and is not particularly limited.

The form of the reinforcing fiber is not particularly limited, and for example, may be a woven fabric, a knitted fabric, a unidirectional material, a continuous fiber, a discontinuous fiber having a specific length, or a combination thereof.

(2) Carbon Fiber

It is preferable that a carbon fiber is used as the reinforcing fiber included in the fastening rods 11, 121, 141, and 151 including protrusion. This is because the carbon fiber has light weight and excellent strength.

As the carbon fiber, in general a polyacrylonitrile (PAN)-based carbon fiber, a petroleum oil and coal pitch-based carbon fiber, a rayon-based carbon fiber, a cellulose-based carbon fiber, a lignin-based carbon fiber, a phenol-based carbon fiber, a vapor phase growth-based carbon fiber, and the like are known, and any carbon fiber may be preferably used. Among them, it is preferable that the polyacrylonitrile (PAN)-based carbon fiber is used from a viewpoint of excellent tensile strength. When the PAN-based carbon fiber is used as the reinforcing fiber, the tensile modulus thereof is preferably in a range of 100 GPa to 600 GPa, is more preferably in a range of 200 GPa to 500 GPa, and is even more preferably in a range of 230 GPa to 450 GPa. In addition, the tensile strength is preferably in a range of 2,000 MPa to 10,000 MPa, and is more preferably in a range of 3,000 MPa to 8,000 MPa.

(3) Fiber Length of Reinforcing Fiber

The fiber length of the reinforcing fiber may be suitably determined according to the type of the reinforcing fibers or the type of the matrix, an orientation state of the reinforcing fibers in the fastening rods 11, 121, 141, and 151, and the like, and is not particularly limited. Therefore, a continuous fiber may be used or a discontinuous fiber may be used according to the purpose.

When the discontinuous fiber is used, it is possible to increase the buckling stress of the fastening rods 11, 121, 141, and 151 as the average fiber length of the reinforcing fiber becomes longer, but when the average fiber length is too long, flowability of the fastening rods 11, 121, 141, and 151 at the time of performing the molding and the thermal caulking tend to be decreased.

Therefore, the average fiber length is preferably in a range of 0.01 mm to 10 mm, is more preferably in a range of 0.01 mm to 5 mm, and is even more preferably in a range of 0.03 mm to 3 mm.

Furthermore, it is preferable that the average fiber length is measured by a weight average fiber length.

Reinforcing fibers of which fiber lengths are different from each other may be used in combination. In other words, the reinforcing fiber may have a single peak in the average fiber length, or may have a plurality of peaks.

(4) Fiber Diameter of Reinforcing Fiber

The fiber diameter of the reinforcing fiber may be suitably determined according to the type of the reinforcing fiber, and is not particularly limited. When a carbon fiber is used as the reinforcing fiber, in general, the average fiber diameter is preferably in a range of 3 μm to 50 μm, is more preferably in a range of 4 μm to 12 μm, and is even more preferably in a range of 5 μm to 8 μm. When a glass fiber is used as the reinforcing fiber, in general, the average fiber diameter is preferably in a range of 3 μm to 30 μm.

Here, the average fiber diameter described above indicates the diameter of a single yarn of the reinforcing fibers. Therefore, when the reinforcing fibers are in a fiber bundle form, the average fiber diameter described above indicates not the diameter of the fiber bundle but the diameter of the reinforcing fiber (the single yarn) constituting the fiber bundle. The average fiber diameter of the reinforcing fibers, for example, can be measured by a method disclosed in JIS R 7607:2000.

4.3.2.5 Thermoplastic Resin Included in Fastening Rod (1) Type of Thermoplastic Resin As previously described in (Thermoplastic Resin Included in Fastening Rod), the thermoplastic resin included in the fastening rods 11, 121, 141, and 151 is not particularly limited, and may be used by being suitably selected according to the usage of the joined body or the like. However, as the matrix, the thermoplastic resin is used as a main component, and in a range where the ultrasonic waves can be applied, a thermosetting resin may be used in combination.

The thermoplastic resin is not particularly limited, and a thermoplastic resin having a desired softening point or melting point may be suitably selected and used while considering excellent mechanical properties, productivity, and the like according to the usage of the joined body. As the thermoplastic resin described above, in general, a thermoplastic resin having a softening point in a range of 180° C. to 350° C. is used, but the thermoplastic resin is not limited thereto.

As the thermoplastic resin, for example, a polyolefin resin, a polystyrene resin, a thermoplastic polyamide resin, a polyester resin, a polyacetal resin (a polyoxy methylene resin), a polycarbonate resin, a (meth)acryl resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluorine-based resin, a thermoplastic polybenzimidazole resin, and the like may be included.

As the polyolefin resin described above, for example, a polyethylene resin, a polypropylene resin, a polybutadiene resin, a polymethyl pentene resin, a vinyl chloride resin, a vinylidene chloride resin, a vinyl acetate resin, a polyvinyl alcohol resin, and the like may be included.

As the polystyrene resin described above, for example, a polystyrene resin, an acrylonitrile-styrene resin (an AS resin), an acrylonitrile-butadiene-styrene resin (an ABS resin), and the like may be included.

As the polyamide resin described above, for example, a polyamide 6 resin (Nylon 6), a polyamide 11 resin (Nylon 11), a polyamide 12 resin (Nylon 12), a polyamide 46 resin (Nylon 46), a polyamide 66 resin (Nylon 66), a polyamide 610 resin (Nylon 610), and the like may be included.

As the polyester resin described above, for example, a polyethylene terephthalate resin, a polyethylene naphthalate resin, a polybutylene terephthalate resin, a polytrimethylene terephthalate resin, liquid crystal polyester, and the like may be included.

As the (meth)acryl resin described above, for example, polymethyl methacrylate may be included. As the modified polyphenylene ether resin, for example, modified polyphenylene ether, and the like may be included. As the thermoplastic polyimide resin described above, for example, thermoplastic polyimide, a polyamide imide resin, a polyether imide resin, and the like may be included. As the polysulfone resin described above, for example, a modified polysulfone resin, a polyether sulfone resin, and the like may be included.

As the polyether ketone resin described above, for example, a polyether ketone resin, a polyether ether ketone resin, and a polyether ketone ketone resin may be included. As the fluorine-based resin described above, for example, polytetrafluoroethylene, and the like may be included. Only one type of the thermoplastic resin included in the fastening rods 11, 121, 141, and 151 including the protrusion may be used, or two or more types thereof may be used. As an embodiment of using two or more types of the thermoplastic resin in combination, for example, an embodiment of using thermoplastic resins of which softening points or melting points are different in combination, an embodiment of using thermoplastic resins of which average molecular weights are different in combination, and the like may be included, but the embodiment is not limited thereto.

(2) Content of Thermoplastic Resin

As previously described in (Content of Thermoplastic Resin Included in Fastening Rod), the content of the thermoplastic resin included in the fastening rods 11, 121, 141, and 151 including the protrusion may be suitably determined according to the type of the thermoplastic resin, the type of the reinforcing fibers, and the like, and is not particularly limited.

The buckling stress of the fastening rods 11, 121, 141, and 151 can increase as the content of the reinforcing fiber becomes greater and the content of the thermoplastic resin becomes smaller, but when the content of the thermoplastic resin it too small, the flowability of the fastening rods 11, 121, 141, and 151 at the time of the molding and the thermal caulking tend to be decreased.

A preferred content of the thermoplastic resin is in a range of 3 parts by weight to 1000 parts by weight with respect to 100 parts by weight of the reinforcing fibers. The content of the thermoplastic resin is preferably 30 parts by weight to 200 parts by weight, is more preferably 30 parts by weight to 150 parts by weight, and is even more preferably 35 parts by weight to 100 parts by weight. When the content of the thermoplastic resin is greater than or equal to 3 parts by weight with respect to 100 parts by weight of the reinforcing fibers, a dry reinforcing fiber that impregnation in the manufacturing process is insufficient decreases, and such content is preferable. In addition, when the content of the thermoplastic resin is less than or equal to 1000 parts by weight, the reinforcing fibers are sufficiently included, and thus the appropriate requisition of the structural material is likely to be satisfied.

(3) Other Additives

In the fastening rods 11, 121, 141, and 151, additives such as various fibrous fillers of an organic fiber or an inorganic fiber or non-fibrous fillers, a flame retardant, an UV resistant agent, a stabilizer, a release agent, a pigment, a softening agent, a plasticizing agent, and a surfactant may be included within a range not impairing the object of the present invention.

4.3.2.6 Manufacturing Method of Fastening Rod

A manufacturing method of the fastening rods 11, 121, 141, and 151 of the present invention is not particularly limited, and for example, injection molding, extrusion molding, press molding, and the like are included. In the case of the injection molding, a conventionally known method may be used. For example, a method where a long fiber pellet, which is a pellet obtained by adjusting a molten thermoplastic resin to be a desired viscosity so as to be impregnated into reinforcing fibers in continuous fiber form, and then by cutting is carried out, is used and a predetermined shape is obtained with an injection molding machine, a method where the reinforcing fibers and the matrix are kneaded, in advance, using a kneader or the like and the kneaded mixture is introduced into an injection molding machine, and a predetermined shaped is obtained, or the like is included.

In general, as the fiber length after the injection molding is longer, the mechanical strength of the obtained shaped product of the fiber reinforced resin is enhanced, and the joining strength at the time of being used in the caulking tends to be enhanced. A method of making the fiber length long is not particularly limited, and as the method, specifically, a method of decreasing the melt viscosity of the matrix at the time of being melted, a method of decreasing the shear rate of the kneader or the injection molding machine, and the like are included.

As another method than the above, a method of arranging, in a mold, a substrate such as a unidirectional sheet (UD sheet) in which continuous strands are aligned in parallel, a woven fabric and discontinuous fibers, introducing a thermoplastic resin therein to perform melt-impregnation or introducing a heat-melt thermoplastic resin to perform impregnation, and then performing cooling or the like is exemplified.

4.3.3 First Member and Second Member

In a case where the first member, the second member, and the other member are included, when it is not necessary that the respective members of the other member are distinctively described, these members are simply referred to as the "member(s) Yi". Furthermore, here, the first member and the second member will be mainly described, but the same as that of the first member and the second member applies to the other member.

4.3.3.1 Shape

The shape of the member(s) Yi is not particularly limited. For example, the shapes of a flat plate, a prism, a polyhedron or the like, which has a flat part and has a cross section thereof being in a shape of polygon such as quadrangle, are included. In general, a flat plate-like member(s) Yi is used. When the first fitting hole, second fitting hole, and the other member are included, it is preferable that the thickness of the member(s) Yi in the vicinity of the fitting hole of the other member is in a range of 1 mm to 20 mm in consideration of the mechanical properties of the fastening rods 11, 121, 141, and 151.

The shapes of the respective members Yi may be identical or different. In addition, the thicknesses of the respective members Yi may be identical or different.

4.3.3.2 Material (1) Example of Material

The material of the member(s) Yi is not particularly limited insofar as the fitting hole is included. As the material of the member(s) Yi, for example, metal, a resin, ceramic, and the like may be included. Furthermore, the types of the first member and the second member or the types of the first member, the second member, and the other member may be identical or different.

As the metal, for example, iron, aluminum, copper, titanium, and an alloy thereof, and the like may be included. Furthermore, a carbon fiber is included in the fastening rod. For this reason, electric corrosion may occur due to the contact between the carbon fiber and the metal, and thus for example, the metal or the fastening rod may be subjected to a surface treatment (coating or the like), or an insulating layer (for example, an insulating tape or the like) may be disposed.

As the resin, a synthetic resin or a non-synthetic resin (a natural material polymer) is included, and as the synthetic resin, either a thermoplastic resin or a thermosetting resin may be used.

As a specific example of the thermoplastic resin, the thermoplastic resins described in (Thermoplastic Resin Included in Fastening Rods 11, 121, 141, and 151 including Protrusion) may be preferably used.

As a specific example of the thermosetting resin, an epoxy resin, a phenol resin, an unsaturated polyester resin, a melamine resin, a urea resin, a curable polyimide resin, and the like may be included.

In the resins described above, as the reinforcing fiber, an inorganic fiber such as a glass fiber and a carbon fiber, an organic fiber such as an aramid fiber, a polyester fiber, and a polyamide fiber may be included.

In particular, from a viewpoint of a balance between mechanical properties and lightweight properties, and electric corrosion, and the like, it is preferable that the member(s) Yi includes the same reinforcing fibers and the same thermoplastic resin as those included in the fastening rods 11, 121, 141, and 151. Therefore, it is preferable that the member(s) Yi is a carbon fiber reinforced thermoplastic resin member.

The type and the fiber length of the reinforcing fibers included in the member(s) Yi may be identical to or different from those included in the fastening rods 11, 121, 141, and 151.

(2) Carbon Fiber

When the reinforcing fiber included in the member(s) Yi is a carbon fiber, the carbon fiber is not particularly limited, and as the carbon fiber, specifically, a PAN-based carbon fiber, and a pitch-based carbon fiber may be included. Among them, the PAN-based carbon fiber has light weight, and thus may be preferably used for reducing the weight of the structural material. Furthermore, the carbon fiber may be independently used, or two or more types of the carbon fiber may be used in combination. The form of the carbon fiber is not particularly limited, and may be either a continuous fiber or a discontinuous fiber.

When the carbon fiber is the continuous fiber, the carbon fiber may be in the form of a knitted fabric or a woven fabric, or may be in the form of a so-called UD sheet in which carbon fibers of the continuous fiber are arranged in one direction to be in the shape of a sheet. In a case of the UD sheet, a stacked body in which a plurality of UD sheets are stacked (for example, stacked to intersect with each other in an orthogonal direction) so that fiber arrangement directions of the respective layers intersect with each other may be used. The average fiber diameter of the continuous fiber, in general, is suitably 5 µm to 20 µm.

In addition, in a case of the discontinuous carbon fiber, the carbon fiber may be in any one of a state of being aligned in a specific direction of the matrix, a state of being two-dimensionally and randomly dispersed in the plane, and a state of being three-dimensionally and randomly dispersed. As the carbon fiber, a carbon fiber having an average fiber diameter of 5 µm to 20 µm and an average fiber length of 1 mm to 100 mm may be used.

When the member(s) Yi is in the shape of a plate, and the carbon fibers are discontinuous and are randomly dispersed in a two-dimensional direction in the plane, the carbon fiber may be formed in the shape of a sheet by being subjected to wet papermaking, or may be arranged so that the discontinuous carbon fibers are dispersed and overlapped.

In this case, the average fiber diameter is 5 µm to 20 µm, and the average fiber length is preferably 1 mm to 100 mm, is more preferably 3 mm to 100 mm, and is even more preferably 5 mm to 50 mm. When the average fiber length is less than 1 mm, a function as the carbon fiber is not sufficiently performed, and thus sufficient joining strength may not be obtained. When the average fiber length is greater than 100 mm, the flowability at the time of the molding decrease, and thus a desired member(s) Yi may not be obtained.

It is preferable that the member(s) Yi may be a three-dimensional isotropic carbon fiber mat in which long axis directions of the carbon fibers are randomly dispersed in the respective directions by entangling carbon fibers to be the shape of cotton, or may be a mat (hereinafter, referred to as a random mat) in which the carbon fibers having an average fiber length in the range described above are substantially two-dimensionally and randomly oriented.

(3) Example of Manufacturing Method of Member(s) Yi

When the thermoplastic resin is used in the member(s) Yi, as a specific manufacturing example, injection molding, extrusion molding, press molding, and the like are included.

In addition, in order to manufacture the member(s) Yi by using the press molding, for example, the UD sheet in which continuous fibers are arranged in one direction or a papermaking sheet formed of a discontinuous fiber, the random mat described above, and the like are used as a single layer or a plurality of layers thereof is layered, they are heated and pressed in a state of including the thermoplastic resin, the thermoplastic resin in these sheets or the mat is melted and impregnated between the fibers to manufacture the member(s) Yi including the thermoplastic resin as the matrix.

(4) Other Agents Included in Member(s) Yi

In the member(s) Yi, additives such as various fibrous fillers of an organic fiber or an inorganic fiber or non-fibrous fillers, a flame retardant, a UV resistant agent, a stabilizer, a release agent, a pigment, a softening agent, a plasticizing agent, and a surfactant may be included within a range not impairing the object of the present invention. In addition, in the fiber reinforced shaped product, a thermosetting resin may be used in combination in addition to the thermoplastic resin within a range not impairing the object of the present invention.

4.3.3.3 First Fitting Hole and Second Fitting Hole

The first fitting holes 115 and 135 are formed in the first members 111 and 131 as illustrated in FIG. 6C and FIG. 7C. The second fitting holes 117 and 137 are formed in the second members 113 and 133 as illustrated in FIG. 6C and FIG. 7C.

When the first members 111 and 131 and the second members 113 and 133 are overlapped in order to be fastened, the first fitting holes 115 and 135 and the second fitting holes 117 and 137 are overlapped, and thus one through hole is configured. Furthermore, when the other member is included, the fitting holes of the first fitting hole, the second fitting hole, and the fitting hole of the other member configure one through hole.

Hereinafter, the first fitting holes 115 and 135, and the second fitting holes 117 and 137 will be described with mainly reference to FIGS. 6A to 6C and FIGS. 7A to 7C. For this reason, as the fastening rod including the protrusion, the fastening rods 11 and 121 illustrated in FIGS. 6A to 6C and FIGS. 7A to 7C are used, but the fastening rods 141 and 151 illustrated in FIGS. 8A and 8B and FIGS. 10A to 10C, a fastening rod including the other protrusion, or the like may be also used. In a case where the first fitting hole, the second fitting hole, and the other member are included, when it is not necessary that the fitting hole of the other member is distinctively described, these fitting holes are simply referred to as the "fitting hole". Here, the first member and the second member will be mainly described, but the same as that of the first member and the second member applies to the other member.

The size (the opening area in the cross-sectional surface) and the shape (the opening shape of the cross-sectional surface) of the fitting holes 115, 117, 135, and 137 are not particularly limited insofar as the middle parts 15 and 125 of the fastening rods 11 and 121 are positioned in the fitting holes 115, 117, 135, and 137.

That is, the first fitting holes 115 and 135 only have to have a configuration of not allowing the head parts 13 and 123 to pass therethrough and of allowing the middle parts 15 and 125 or the other end portions 16 and 126 to pass therethrough. The fitting holes of the second fitting holes 117 and 137, and the other member only have to have a configuration of allowing the middle parts 15 and 125 or the other end portions 16 and 126 to pass therethrough.

For example, in a case of the fastening rods 11 and 121 as illustrated in FIG. 6A or FIG. 7A, the size of the first fitting holes 115 and 135 may be set so that the middle parts 15 and 125 can pass therethrough, and the head parts 13 and 123 cannot pass therethrough. That is, the minimum opening area in the cross-sectional surface of the first fitting holes 115 and 135 is larger than the maximum area of the cross-sectional surface of the middle parts 15 and 125 of the fastening rods 11 and 121, and is smaller than the minimum area of the cross-sectional surface of the head parts 13 and 123.

By such a configuration, the head parts 13 and 123 can be in contact with the first member without passing through the first members 111 and 131. Meanwhile, the knob-like protrusion 17 or the rib-like protrusion 127 may not be included in the area of the cross-sectional surface of the middle parts 15 and 125.

At the time of performing the fastening, when a part or all of the head part 13 of the fastening rod 11 is positioned in the first fitting hole 115 of the first member 111 as illustrated in FIG. 6B, the minimum opening area of the cross-sectional surface of the first fitting hole 115 is smaller than the maximum area of the cross-sectional surface of the head part 13 of the fastening rod 11, and is larger than the minimum area.

Accordingly, the head part 13 of the fastening rod 11 is or can be in contact with the inner circumferential surface of the first fitting hole 115 of the first member 111.

When the second fitting holes 117 and 137 and the other member are included, the size of the fitting hole of the other member may be set so that the middle parts 15 and 125 and the other end portions 16 and 126 can pass therethrough as illustrated in FIG. 6C or FIG. 7C, and is not particularly limited. That is, the minimum opening area of the cross-sectional surface of the fitting hole of the second fitting holes 117 and 137 or the other member is larger than the maximum area of the cross-sectional surface of the middle parts 15 and 125 or the other end portions 16 and 126 of the fastening rods 11 and 121.

When the second fitting holes 117 and 137 and the other member are included, the size of the fitting hole of the other member may be larger than that of the first fitting holes 115 and 135, may be smaller than that of the first fitting holes 115 and 135, or may be identical to that of the first fitting holes 115 and 135.

The opening shape of the cross-sectional surface of the fitting holes 115, 117, 135, and 137 may be identical to or different from the cross-sectional shape of the head parts 13 and 123, the middle parts 15 and 125, and the other end portions 16 and 126 of the fastening rods 11 and 121. Furthermore, when the second fitting holes 117 and 137 and the other member are included, the opening area or the opening shape of the cross-sectional surface of the first fitting holes 115 and 135 may be identical to or different from the opening area or the opening shape of the cross-sectional surface of the fitting hole of the other member.

The fitting holes 115, 117, 135, and 137, for example, may be in the shape of a column such as a cylinder or a rectangular cylinder, a cone such as a circular cone or a pyramid, a truncated cone such as a circular truncated cone or a truncated pyramid, and the like. Among them, when the fitting holes 115, 117, 135, and 137 are formed by using punching, the shapes of a cylinder, a circular cone, a pyramid, and a trapezoid have few elements depending on a draft angle of a mold at the time of molding the fastening rod, and thus may be preferably used.

As an example of the shape and the size of the fitting holes 115, 117, 135, and 137, when the middle parts 15 and 125 of the fastening rods 11 and 121 are in the shape of a cylinder, the opening area of the fitting holes 115, 117, 135, and 137 is preferably 1.05 times to 4 times, is more preferably 1.1 times to 3 times, and is even more preferably 1.15 times to 2.3 times as large as the area of the cross-sectional surface of the middle parts 15 and 125 of the fastening rods 11 and 121.

A method of obtaining the fitting holes 115, 117, 135, and 137 is not particularly limited, and for example, a method of boring a hole by using a drill, an end mill, a water jet, laser, and the like, a method of performing press molding with respect to the molding material of the member(s) Yi by using a mold in which a punching blade is provided in advance at a portion corresponding to the fitting holes 115, 117, 135, and 137, and the like are included.

4.3.4 Relationship Between Protrusion and Fitting Hole

Hereinafter, a relationship between the protrusion and the fitting hole to which the protrusion is engaged will be described by using the protrusion and the first fitting hole as an example.

A relationship between the protrusion and the first fitting hole will be described with mainly reference to FIGS. 6A to 6C and FIGS. 7A to 7C in which the first fitting hole is illustrated. For this reason, as the fastening rod including the protrusion, the fastening rods 11 and 121 illustrated in FIGS. 11A to 11C and FIGS. 12A and 12B are used, but the fastening rods 141 and 151 illustrated in FIGS. 8A and 8B to FIGS. 10A to 10C, the other fastening rod, and the like may be also used.

A relationship between the protrusions 17 and 127 and the first fitting holes 115 and 135 may be a relationship in which the protrusions 17 and 127 are in contact with the inner circumferential surface or the circumferential edge of the first fitting holes 115 and 135. The protrusion such as the protrusions 17 and 127 is suitably designed according to the number, the shape, and the material (quality of material) of protrusions 17 and 127, and the material (quality of material) of the first members 111 and 131. From a viewpoint of the contact area of the protrusion and the fitting hole, the number of protrusions is preferably greater than or equal to 4, and is more preferably greater than or equal to 8.

As a thermally caulking method, a method of pressing the fastening rods 11 and 121 towards the head parts 13 and 123 side from the other end portions 16 and 126 may be used. Furthermore, as an example of the pressing method, a method of applying the ultrasonic waves is included.

From the above description, a relationship between the rib-like protrusions 17 and 127 and the first fitting holes 115 and 135 is regulated by a separating load at the time of separating the fastening rods 11 and 121 from the first fitting holes 115 and 135. That is, in a case where the fastening rods 11 and 121 are pressed at the time of the thermal caulking, even when the fastening rods 11 and 121 are not supported by the one end side or comparatively weakly supported at the time of the caulking (the pressing), it is possible to prevent the fastening rods 11 and 121 from being detached from the first members 111 and 131 insofar as the protrusions 17 and 127 and the first fitting holes 115 and 135 can be configured so that the separating load (refer to Table 1) is higher than the pressing load. Furthermore, the separating load tends to be approximately half of the inserting load at the time of inserting the fastening rod into the first fitting hole of the first member.

The value of the separating load is not particularly limited, is preferably greater than or equal to 1 N from a viewpoint of preventing the fastening rod from being detached at the time of performing transporting work, is more preferably greater than or equal to 25 N from a viewpoint of stably performing the thermal caulking even when the fastening rod including the protrusion is not supported by the one end side (or is comparatively weakly supported), and is even more preferably greater than or equal to 50 N.

At this time, a control method of the separating load is not particularly limited, and for example, a method of controlling a tightening margin at the time of being pressed in is included. A press-in tightening margin is a difference between a fitting hole diameter and the maximum outer diameter (L) of the fastening rod which is larger than the fitting hole diameter, and the press-in tightening margin is preferably larger than or equal to 0.05 mm, is more preferably larger than or equal to 0.1 mm, and is even more preferably larger than or equal to 0.2 mm. The upper limit is preferably 0.7 mm, and is more preferably 0.6 mm. When the upper limit of the press-in tightening margin is less than or equal to 0.7 mm, a breakage in the protrusion of the fastening rod including the protrusion decreases, and the upper limit is preferable.

When the caulking is performed by using the ultrasonic waves, the protrusions 17 and 127 and the first fitting holes 115 and 135 may be configured so that the separating load is larger than or equal to the pressing load at the time of the caulking. In other words, the protrusions 17 and 127 and the first fitting holes 115 and 135 may be configured so that the inserting load is larger than or equal to 2 times the pressing load. Furthermore, this relationship applies to the knob-like protrusion. In addition, the relationship described above also applies to the second fitting holes 117 and 137 or the fitting hole of the other member.

4.3.5 Intermediate Body

The intermediate body of the present invention is used for the joined body formed by caulking the other end portion of the fastening rod including the protrusion, in a state where the one end portion of the fastening rod including the protrusion which passes through the first fitting hole of the first member and the second fitting hole of the second member is positioned at the first member side, to fasten the first member and the second member, and is integrated with at least one of the first member and the second member in a state the fastening rod including the protrusion passes through at least the first fitting hole. The fastening rod including the protrusion includes the reinforcing fibers and the thermoplastic resin, and the fastening rod including the protrusion includes one or more protrusions which are engaged with at least one of the first fitting hole and the second fitting hole.

The intermediate body is not likely to be detached at the time of transporting the fastening rod including the protrusion since the fastening rod including the protrusion is engaged with at least one of the first fitting hole and the second fitting hole, and the convenience of the intermediate body at the time of being circulated increases.

It is preferable that the protrusion is formed in a region facing the circumferential surface of at least one of the first fitting hole and the second fitting hole, and is in the shape of a rib extending along the central axis of the fastening rod including the protrusion.

In addition, from a viewpoint of preventing the fastening rod including the protrusion which is engaged with the intermediate body from being detached, it is preferable that the separating load from at least one of the first fitting hole and the second fitting hole of the fastening rod including the protrusion is greater than or equal to 1 N.

Further, even when the fastening rod including the protrusion which is engaged with the intermediate body is not supported by the one end side (or is comparatively weakly supported), the separating load is preferably greater than or equal to 25 N, and is more preferably greater than or equal to 50 N from a viewpoint of stably performing the thermal caulking.

4.3.6 Caulking

Here, the caulking will be described with mainly reference to FIGS. 6A to 6C and FIGS. 7A to 7C. For this reason, as the fastening rod, the fastening rods 11 and 121 illustrated in FIGS. 6A to 6C and FIGS. 7A to 7C are used, and the fastening rods 141 and 151 illustrated in FIGS. 8A and 8B and FIGS. 10A to 10C, the other fastening rod, and the like may be also used.

The caulking is performed with respect to the protrusion portion (the other end portion) 16 and 126 protruding from the fitting holes 117 and 137 of the member (here, the second members 113 and 133 illustrated in FIGS. 6A to 6C and FIGS. 7A to 7C) positioned on the other end side of the middle parts 15 and 125 which pass through the first fitting holes 115 and 135 and the second fitting holes 117 and 137 or the fitting hole of these members Yi in a case where the other member is included, in a state where the first member 111 and 131 and the second members 113 and 133, and the other member in the case where the other member is included, are overlapped.

Furthermore, the member Yi positioned on the other end side at the time of including the second member and the other member will be simply referred to as the "member at the other end side" or the "member positioned at the other end side".

The fastening rods 11 and 121 are constituted by the reinforcing fibers and the thermoplastic resin. For this reason, the caulking indicates that the caulking portions 119 and 139 are formed by thermally deforming the other end portions 16 and 126 as illustrated in FIG. 6C or FIG. 7C.

The thermal deformation indicates that the thermoplastic resin is softened or melted by heat, and thus the original shape is changed to the other shape. Here, the caulking portions 119 and 139 may have a structure in which the caulking portions 119 and 139 are not allowed (are regulated) to pass through the fitting holes 117 and 137 positioned on the other end side, and the shape, the size, and the like of the caulking portions 119 and 139 are not particularly limited.

In general, the area of the cross-sectional surface of the caulking portions 119 and 139 may be greater than the minimum opening area cross-sectional surface of the fitting hole of the member which is positioned at the other end side. However, when the fitting hole positioned at the other end side, for example, has an elongated "−" shape or an elongated "+" shape in a certain direction in a plan view, the area of the cross-sectional surface of the caulking portion may be smaller than the minimum opening area of the cross-sectional surface of the fitting hole insofar as the caulking portion includes a portion which can be in contact with the vicinity of the fitting hole. That is, the same size, the same shape, and the like as those of the first fitting hole and the head part apply to a relationship between the fitting hole on the other end side and the caulking portion.

By forming the caulking portions 119 and 139 satisfying the relationship described above, the caulking portions 119 and 139 are regulated from passing through the fitting holes 117 and 137 positioned at the other end side, and the first members 111 and 131 and the second members 113 and 133 are fastened. That is, the joined bodies 100 and 130 which are formed by fastening the first members 111 and 131 and the second members 113 and 133 by the fasteners 19 and 129 are formed.

As described above, the thermal caulking is performed in a state where the thermoplastic resin is softened by heat, and thus it is possible to comparatively decrease the pressing load exerted to the fastening rods 11 and 121.

The caulking portions 119 and 139 may be or may not be adhered to the members 113 and 133 positioned at the other end side. For example, when the caulking is performed in a state where the thermoplastic resin of the other end portions 16 and 126 is melted to have low viscosity, the caulking portions 119 and 139 may be adhered to the members 113 and 133 at the other end side.

As a heating method for performing the thermal deformation, a method of applying an ultrasonic vibration or a low frequency vibration, a method of emitting laser or an infrared ray, a method of using heat conduction, and the like may be used. Furthermore, the ultrasonic vibration can instantly increase the temperature of a portion to be caulked (the other end portion of the fastening rod) by the energy of the vibration, and can perform the caulking without applying heat since the vibration is directly transmitted to the caulking portion from a horn having a caulking shape, and thus is preferable as the caulking method.

Figure 11A:
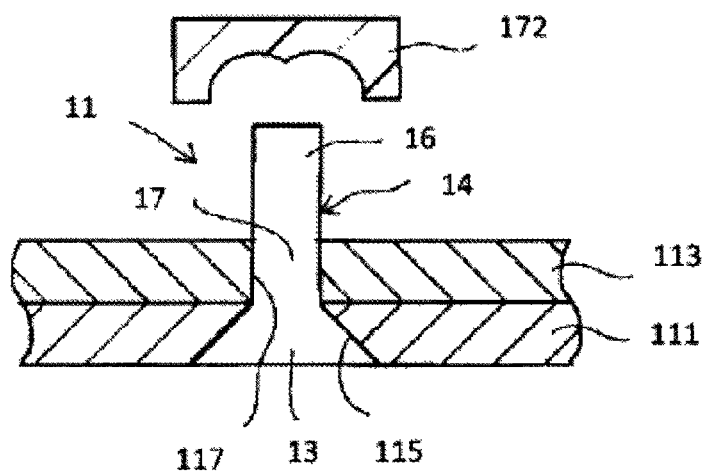
FIGS. 11A to 11C are schematic views at the time of applying the ultrasonic waves to the fastening rod.
Figure 11B:
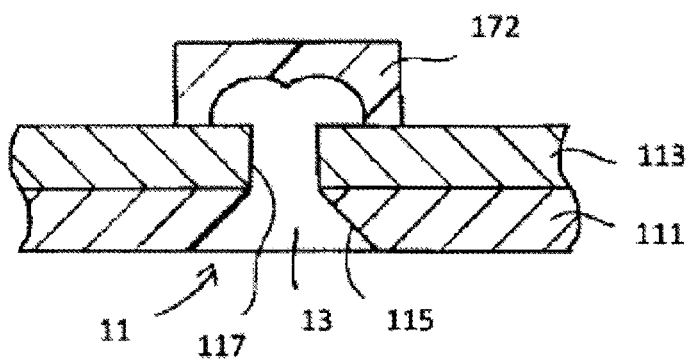
Figure 11C:
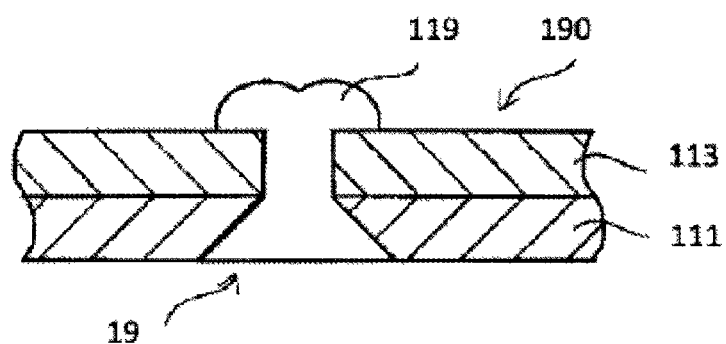

FIGS. 11A to 11C are a diagram illustrating the caulking of the ultrasonic waves.

The fastening rod illustrated in FIGS. 11A to 11C is the fastening rod 11 illustrated in FIG. 11A. Here, the protrusion of the fastening rod 11 is not illustrated. Furthermore, in FIGS. 11A to 11C, the first member 111 and the second member 113 are fastened by the fastening rod 11, but even when the other member is included in addition to the first member and the second member, the caulking of the ultrasonic waves may be also performed with respect to the other end portion of the fastening rod.

The fastening rod 11 passes through the first fitting hole 115 of the first member 111 from the tip end of the body part 14 (the other end portion 16). At this time, the head part 13 of the fastening rod 11 is in contact with the circumferential surface of the first fitting hole 115, and as illustrated in FIG. 11B, the protrusion 17 formed in the middle part 15 is engaged with the first fitting hole 115, and thus the fastening rod 11 is temporarily stopped.

In this state, as illustrated in FIG. 11A, the second member 113 is overlapped so that the second fitting hole 117 is fitted into the middle part 17 protruding from the first fitting hole 115.

Next, as illustrated in FIG. 11A, the tip end of the other end portion 16 is covered with a horn 172 from the protruding direction of the other end portion 16, and the ultrasonic waves are applied to the other end portion 16. Accordingly, the thermoplastic resin of the other end portion 16 starts to be softened (further, melted).

When the thermoplastic resin starts to be melted, the horn 172 becomes closer to the second member 113 (at this time, a load for pressing the horn 172 is the pressing load). Accordingly, as illustrated in FIG. 11B, the softened or melted thermoplastic resin is deformed (plastically deformed) into the shape which is greater than the fitting hole (here, the second fitting hole 117) of the member (here, the second member 113) which is positioned at the end side according to the inner circumferential shape of the horn 172.

After that, the horn 172 is detached, and the temperature of the softened or melted thermoplastic resin decreases.

Accordingly, as illustrated in FIG. 11C, the caulking portion 119 is formed, and the first member 111 and the second member 113 are fastened by the fastener 19.

The caulking conditions are suitably set according to the type, the resin content rate, and the like of the thermoplastic resin used in the fastening rod 11, and are not particularly limited. Furthermore, for reference, an example of the caulking conditions will be described. The caulking may be performed at an amplitude of 10 μm to 100 μm and a pressing force of 0.01 to 1.0 kN for a caulking time of 1 second to 10 seconds by using, for example, an ultrasonic machine (manufactured by BRANSON Ultrasonics, 2000× 800 W 40 kHz).

5. Joined Body Having Concaves and Convexes in Surface of Fastening Rod 5.1

As an example of the joined body of the present invention, it is preferable that the two or more members Yi include the first member and the second member, and the first member and the second member respectively include the first fitting hole and the second fitting hole, in a state where the one end portion of the fastening rod passing through the first fitting hole of the first member and the second fitting hole of the second member is positioned at the first member side, the other end portion of the fastening rod is caulked to fasten the first member and the second member, when the other end portion of the fastening rod is caulked, the other end portion is deformed and covers the surface of the fastening rod, and the covered surface of the fastening rod has concaves and convexes.

5.2

When a tensile strength test is performed, a breakage may occur at an interface (a surface indicated by an arrow "204" in FIG. 16) between a portion of the fastening rod, which is deformed after being caulked, and a portion of the fastening rod, which is not deformed.

Figure 15:
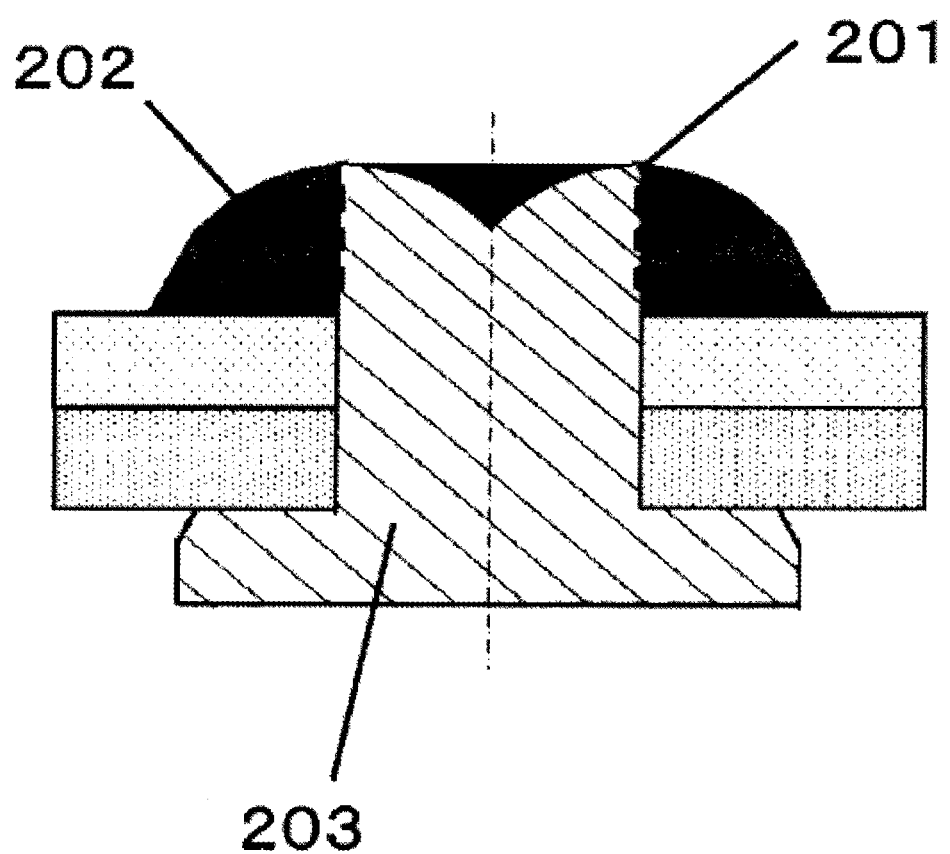
FIG. 15 is a sectional view illustrating the joined body using the fastening rod.

In order to prevent the breakage at the interface, it is preferable that the other end portion is deformed at the time of caulking the other end portion and covers the surface of the fastening rod, and the covered surface of the fastening rod has concaves and convexes (for example, the shape as illustrated in FIG. 15).

Figure 14:
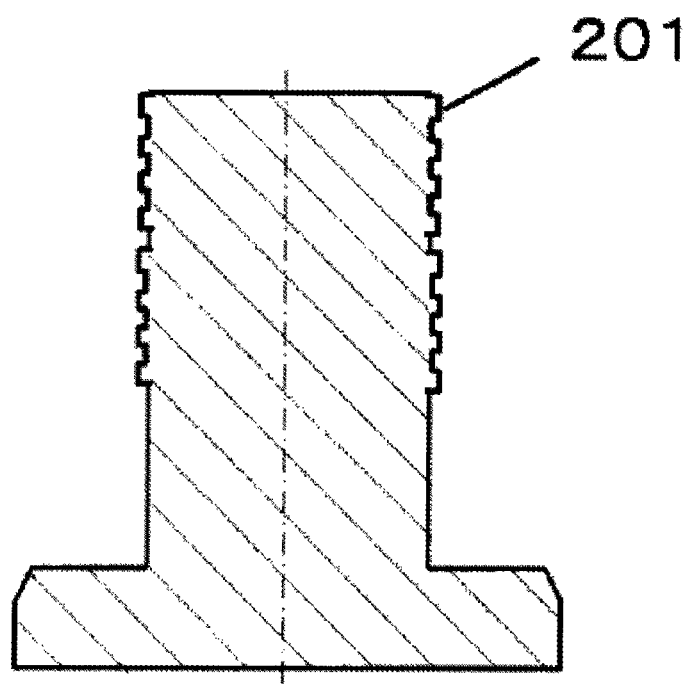
FIG. 14 is a diagram illustrating an example of the fastening rod.

When the joined body is prepared by using the fastening rod having concaves and convexes illustrated in FIG. 14, for example, the joined body including a joining portion as illustrated in FIG. 15 is formed. "202" in FIG. 15 is a portion in which the other end portion is thermally caulked and the resin is deformed, and covers the concaves and convexes ("201" in FIG. 15) of the fastening rod. When the joining strength (for example, cross tension strength) of the joined body is tested, the breakage at the interface between the portion of the fastening rod, which is deformed, and the portion of the fastening rod, which is not deformed, decreases due to the concaves and convexes, and thus the joining strength as the joined body is improved. The concaves and convexes have an anchor effect, and increase the welding area of the interface (for example, "204" in FIG. 16), and thus are advantageous for improving the joining strength.

5.3

Furthermore, the first member, the second member, the first fitting hole, the second fitting hole, the one end portion, and the other end portion are identical to those described in "4. Fastening Rod Including Protrusion, and Intermediate and Joined Body Used Therein".

6. Joined Body Caulked in State Where Gap is Positioned between Fastening Rod and Second Fitting Hole 6.1

As an example of the joined body of the present invention, it is preferable that the two or more members Yi include the first member and the second member, and the first member and the second member respectively include the first fitting hole and the second fitting hole, in a state where the one end portion of the fastening rod passing through the first fitting hole of the first member and the second fitting hole of the second member is positioned at the first member side and a gap is present between the fastening rod and the second fitting hole, the other end portion of the fastening rod is caulked to fasten the first member and the second member, and when the caulking is performed, the other end portion is deformed and enters into the gap, and thus the end portion is adhered to the surface of the fastening rod.

6.2

As described above, when the tensile strength test is performed, the breakage may occur at the interface (a surface indicated by an arrow "204" in FIG. 16) between a portion of the fastening rod, which is deformed, and a portion of the fastening rod, which is not deformed.

In order to prevent the breakage at the interface, it is preferable that the other end portion is caulked in a state where the gap is present between the fastening rod and the second fitting hole (for example, FIG. 17), the other end portion is deformed at the time of being caulked and enters into the gap, and thus the gap is adhered to the surface of the fastening rod.

Figure 16:
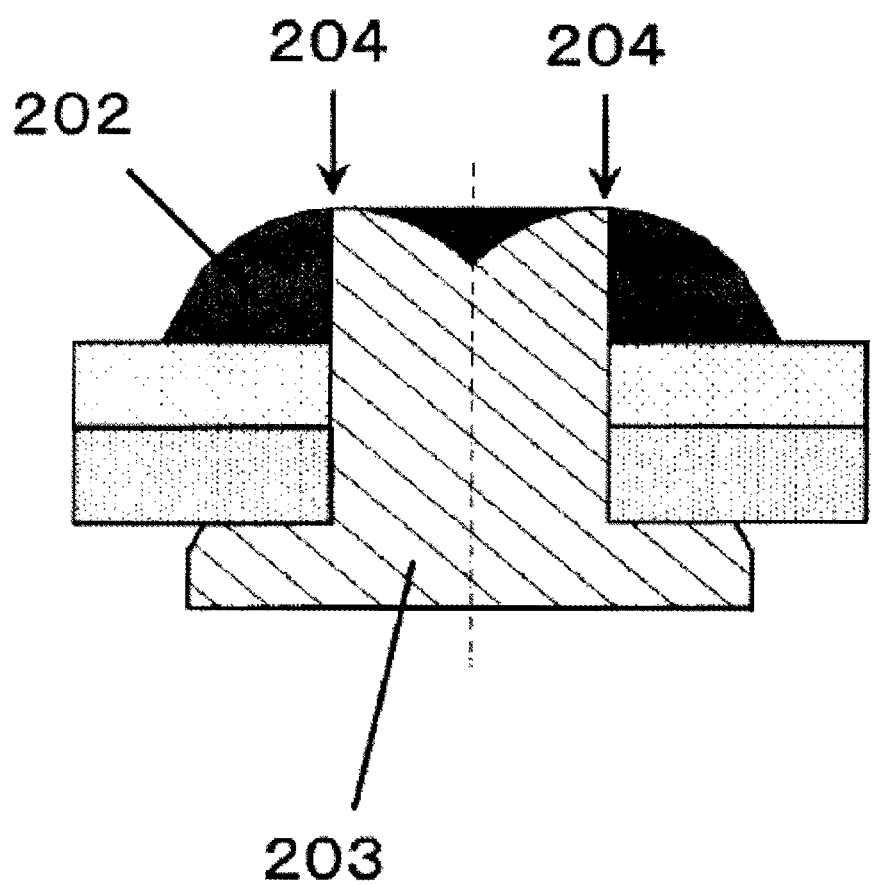
FIG. 16 is a sectional view illustrating the joined body using the fastening rod.

By preparing the joined body in this way, the adhering area of the other end portion which is deformed and the fastening rod increases, and for example, the breakage at the interface indicated by "204" in FIG. 16 decreases, and thus the joining strength is improved.

Furthermore, it is preferable that the resin which is deformed and enters into the gap is also adhered to the second member.

6.3

The first member, the second member, the first fitting hole, the second fitting hole, the one end portion, and the other end portion are identical to those described in "4. Fastening Rod Including Protrusion, and Intermediate and Joined Body Used Therein".

EXAMPLES

Examples will be described below, but the present invention is not limited thereto.

1. Various Evaluations

Each value in this example was obtained according to the following method.

(1) The cross tension strength of the joined body was measured according to No. M406-87 issued in March, 1987 by The Society of Automotive Engineers of Japan (JSAE). Specifically, the cross tension strength was obtained at the size of a test piece of 25 mm×75 mm×2.5 mm and a tensile rate of 5 mm/s.

(2) Average Fiber Length of Carbon Fiber Included in Fastening Rod

The fastening rod was put into a crucible and was heated at 550° C. for 1.5 hours under an aerobic atmosphere, and thus a resin component was burned and removed. The remaining carbon fiber was put into water into which a surfactant was put, and was sufficiently stirred by an ultrasonic vibration. The stirred dispersion liquid was randomly extracted by a measuring spoon in order to obtain a sample for evaluation, and the length of 100 fibers was measured by using an image analysis device Luzex AP manufactured by Nireco Corporation, and thus the average fiber length of the carbon fiber was obtained.

Furthermore, the average fiber length was measured by the weight average fiber length (Expression (2) described below).

When the fiber length of each of the carbon fibers is Li, and the number of carbon fibers to be measured is j, a number average fiber length (Ln) and a weight average fiber length (Lw) are obtained by Expressions (1) and (2) described below.

$$Ln = \Sigma Li/j \quad \text{Expression (1)}$$

$$Lw = (\Sigma Li^2)/(\Sigma Li) \quad \text{Expression (2)}$$

(3) The buckling stress of the fiber reinforced resin fastening rod was measured by a compression test according to JIS K 7181:2011.

(4) Test Inserting Test Using Fastening Rod Including Protrusion

Figure 12A:
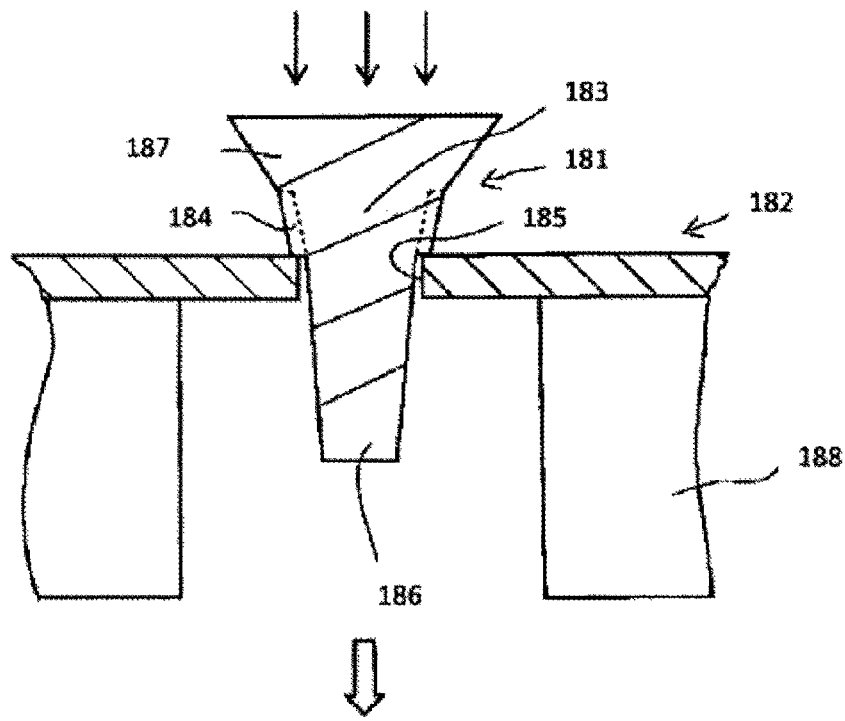
FIGS. 12A and 12B are diagrams illustrating a test of inserting the fastening rod into a first fitting hole.
Figure 12B:
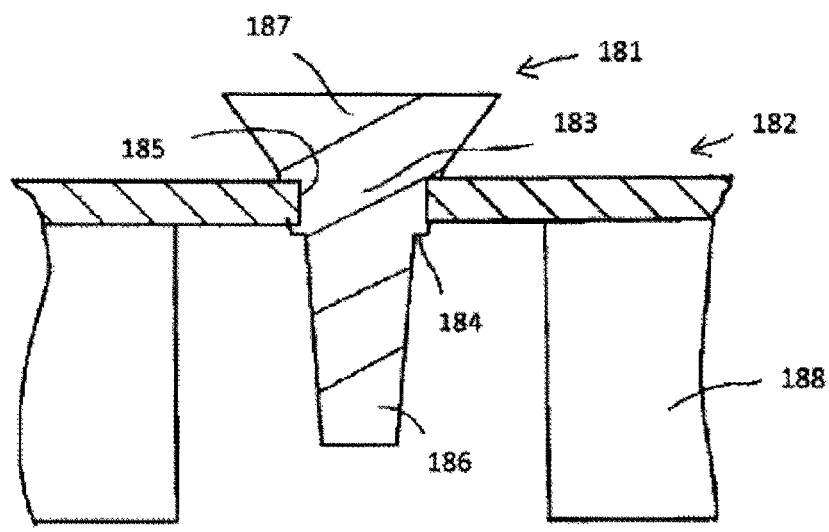

FIGS. 12A and 12B are a diagram illustrating an aspect in which the fastening rod 181 including the protrusion is inserted into the first member 182.

The fastening rod 181 includes the rib-like protrusion 184 in the middle part 183. The opening area of the cross-sectional surface of the first fitting hole 185 of the first member 182 is greater than the area of the cross-sectional surface of the middle part 183. The protruding size of the protrusion 184 is greater than the interval between the circumferential surface of the first fitting hole 185 and the circumferential surface of the intermediate part 183.

In the test, the other end portion 186 of the fastening rod 181 is inserted into the first fitting hole 185 of the first member 182 which is arranged in the shape of a jig 188, and the protrusion 184 is in contact with the circumferential edge of the first fitting hole 185.

In this state, as illustrated in FIG. 12A, the head part 187 of the fastening rod 181 is pressed by a universal tester in an arrow direction, an as illustrated in FIG. 12B, the protrusion 184 is inserted into the first fitting hole 185. Then, when the head part 187 is in contact with the first member 182, the test ends.

The test is performed at an inserting rate of 0.1 mm/s, and the inserting load is the maximum load at the time of pressing the fastening rod 181.

(5) Separating Test Using Fastening Rod Including Protrusion

Figure 13A:
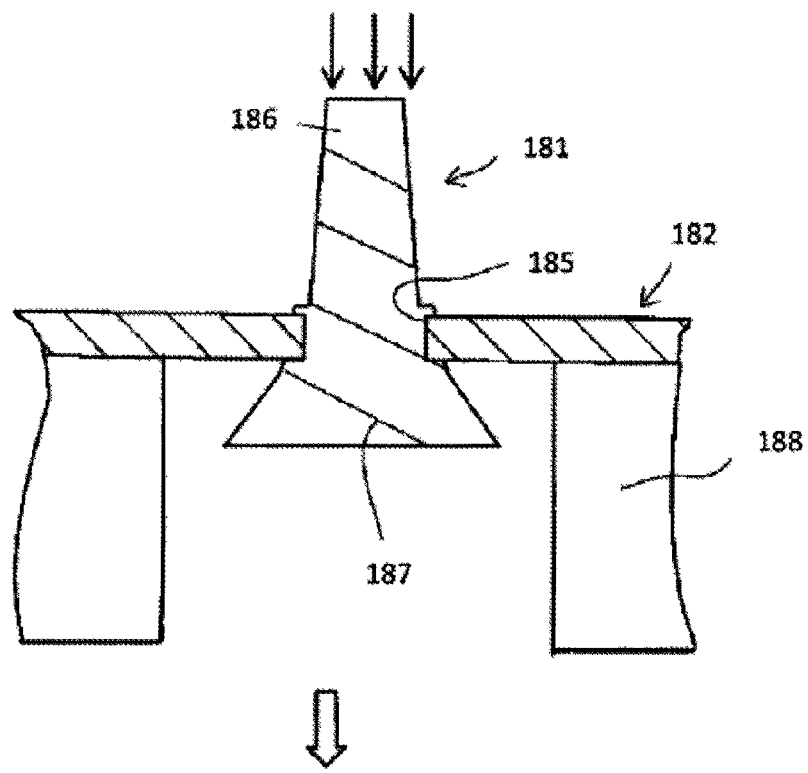
FIGS. 13A and 13B are diagrams illustrating a test of separating the fastening rod from the first fitting hole.
Figure 13B:
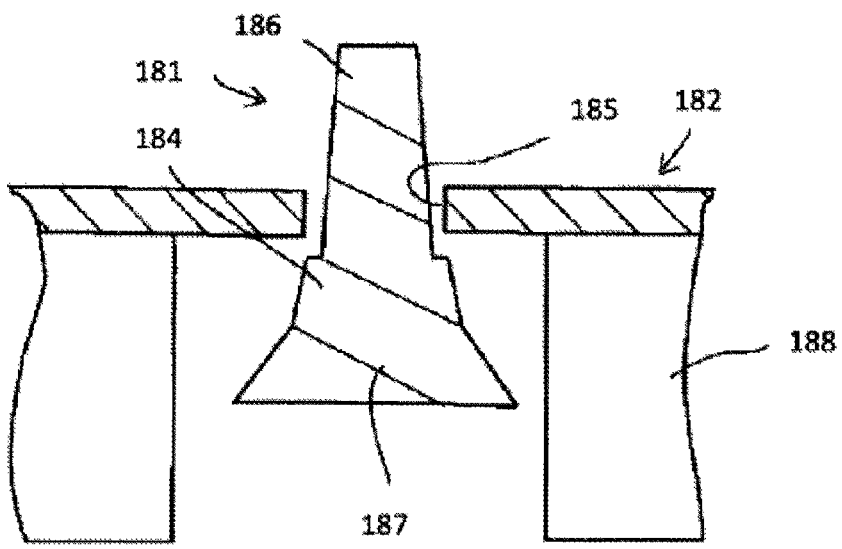

FIGS. 13A and 13B are a diagram illustrating an aspect in which the fastening rod 181 is separated from the first member 182.

In the inserting test described above, the first member 182 into which the fastening rod 181 is inserted is vertically reversed as illustrated in FIG. 13A, and is disposed on the jig 188.

In this state, as illustrated in FIG. 13A, the other end portion 186 of the fastening rod 181 is pressed by the universal tester in the arrow direction, and the fastening rod 181 is pressed downward. Then, as illustrated in FIG. 13B, the pressing is performed until the fastening rod 181 is detached from the first member 182. At this time, the maximum load is the separating load shown in Table 1. Furthermore, the test was performed at a compressing rate of 0.1 mm/s.

(3) State after being Pressed in

The protrusion at the time of being pressed in was observed, and thus an evaluation of ○ to x was performed.

○ (Excellent): There was no problem and the fastening rod was pressed in.

Δ (Good): The fastening rod was pressed in, but a breakage was observed in a part of the protrusion disposed in the fastening rod.

x (Bad): The protrusion was considerably broken, and thus was not able to be pressed in.

2. Manufacturing of Test Material

2.1 Reference Example 1

Manufacturing of Member Y1

As the carbon fiber, a carbon fiber "Tenax" (registered trademark) STS40-24KS (the average fiber diameter of 7 μm) manufactured by Toho Tenax Co., Ltd. which was cut to have the average fiber length of 30 mm was used and as the matrix, a Nylon 6 resin A1030 manufactured by Unitika Limited was used to prepare a reinforcing fiber mat containing the Nylon 6 resin in which the carbon fibers were isotropically oriented, the carbon fiber areal weight was 1800 g/m$^2$ and the Nylon 6 resin areal weight was 1500 g/m$^2$, on the basis of a method disclosed in Pamphlet of International Publication No. WO 2012/105080. A rotary cutter was used as a cutting device, and an isotropic base material was obtained by setting the pitch of blades to 30 mm and by cutting the carbon fiber to be a fiber length of 30 mm. The carbon fibers in such an isotropic base material were randomly dispersed in a two-dimensional direction.

This isotropic base material was heated at 2.0 MPa for 5 minutes by a pressing device which was heated at 260° C. by using a mold including a concave portion at an upper portion, and thus a flat plate having a thickness of 2.3 mm was obtained. In the carbon fibers included in the flat plate, a single yarn form and a fiber bundle form of which a part was opened were mixed. The carbon fibers were isotropically dispersed in a plane direction of the flat plate. The critical number of single fiber was 86, a ratio of the carbon fiber bundle to the total amount of fibers was 86 Vol %, and the average number of fibers was 420.

The obtained flat plate was cut to have a size of 390 mm×390 mm, was dried by a hot air drier at 120° C. for 4 hours, and then the temperature of the flat plate was increased up to 280° C. by an infrared ray heater. A mold including a cavity of 400 mm×400 mm was set at 140° C., and the heated flat plate was introduced to the mold. Subsequently, the flat plate was pressed at a pressing pressure of 5 MPa for 1 minute, and thus a member precursor of 400 mm×400 mm×2.5 mm was obtained. This precursor was cut to have a size of 25 mm×75 mm, a fitting hole having a diameter of 8 mm was disposed at the center by using a HAM342 carbide FRP drill, and thus a member Y1 was obtained.

Reference Example 2

Metal Steel Plate SPCC (Member Y2)

A metal steel plate (SPCC) was prepared, and a fitting hole having a diameter of 8 mm was disposed at the center by using a B-TSD drill for iron and steel (manufactured by Mitsubishi Materials Corporation), and thus a member Y2 was obtained.

3. Various Examples

Example 1

As the carbon fiber, 100 parts by weight of a carbon fiber "Tenax" (registered trademark) STS40-24KS (the average fiber diameter of 7 μm) manufactured by Toho Tenax Co., Ltd. which was cut to have the average fiber length of 20 mm, and as a matrix, 300 parts by weight of a Nylon 6 resin A1030 manufactured by Unitika Limited were put into a twin screw kneading extruder (KTX-30, manufactured by Kobe Steel Ltd.) (a weight ratio (%) of the carbon fiber in a fastening rod was 25%). At this time, the carbon fiber was a single yarn form, and the average fiber length was 0.3 mm.

A fastening rod 4-1 in the shape in which a rod diameter was 8 mm and a rod length was 19 mm as illustrated by "4" in FIG. 2A was prepared by using JSW180H manufactured by Japan Steel Works, Ltd. as an injection molding machine. In addition, the buckling stress of the fastening rod 4-1 was 95 MPa.

Two members Y1 which were prepared in Reference Example 1 were prepared, and were overlapped so that the fitting holes were in the same position, then the fastening rod 4-1 was inserted into the fitting hole, and the fastening rod 4-1 was caulked and fastened by using an ultrasonic machine (2000λ800 W 40 kHz, manufactured by BRANSON Ultrasonics) as illustrated in FIG. 3B, and thus a joined body was obtained. The caulking conditions included a caulking time of 5 seconds, an amplitude of 30 μm, and a pressing force of 0.15 kN. The cross tension strength of the joined body was 3.0 kN. The results thereof are shown in Table 1.

Example 2

A joined body was obtained by the same method as that in Example 1 except that a fastening rod 4-2 using 186 parts by weight of the Nylon 6 resin A1030 which was used as the matrix (a weight ratio (%) of the carbon fiber in the fastening rod was 35%). The results thereof are shown in Table 1.

Example 3

A joined body was obtained by the same method as that in Example 1 except that a fastening rod 4-3 using 122 parts by weight of the Nylon 6 resin A1030 which was used as the matrix (a weight ratio (%) of the carbon fiber in the fastening rod was 45%). The results thereof are shown in Table 1.

Example 4

A joined body was obtained by the same method as that in Example 1 except that a member as a fastening target was changed to the member Y1 and the member Y2, the fastening rod 4-1 was inserted from the member Y1 side, and was caulked at the member Y2 side. The results thereof are shown in Table 1.

Example 5

A joined body was obtained by the same method as that in Example 1 except that the diameter of the fitting hole disposed in the member Y1 prepared in Reference Example 1 was 6 mm, a fastening rod 4-4 in which the rod diameter of the fastening rod manufactured in Example 1 was 6 mm were used, and the caulking time was 3 seconds. The results thereof are shown in Table 1.

Example 6

A joined body was obtained by the same method as that in Example 1 except that the diameter of the fitting hole disposed in the member Y1 prepared in Reference Example 1 was 10 mm, a fastening rod 4-5 in which the rod diameter of the fastening rod manufactured in Example 1 was 10 mm, and the caulking time was 7 seconds. The results thereof are shown in Table 1.

Comparative Example 1

The Nylon 6 resin A1030 manufactured by Unitika Limited as the matrix was put into the twin screw kneading extruder (KTX-30, manufactured by Kobe Steel Ltd.) without using the reinforcing fibers, was kneaded, and then a fastening rod 4-6 in the shape of "4" in FIG. 2A was prepared by using JSW180H manufactured by Japan Steel Works, Ltd. as the injection molding machine. The buckling stress of the fastening rod 4-6 was 45 MPa. When ultrasonic waves were applied, 9 seconds were required for the caulking time. The results thereof are shown in Table 1.

Example 7

A joined body was prepared by the same method as that in Example 2 except that a caulking head was set at 320° C. by using a thermal caulking device instead of applying the ultrasonic waves, and the fastening rod 4-2 was heated and then caulked. Excessive heat was applied to the fastening rod 4-2 compared to Example 2 in which the caulking was performed by using the ultrasonic waves, and thus the strength was slightly decreased.

Example 8

A joined body was prepared by the same method as that in Example 2 except that a fastening rod 4-21 was used in which the average fiber length of the carbon fiber in the fastening rod was adjusted to be 0.5 mm.

Example 9

A joined body was prepared by the same method as that in Example 2 except that a fastening rod 4-22 including polycarbonate (L-1225Y, manufactured by Teijin Limited) was used instead of the Nylon 6 resin A1030 which was used as the thermoplastic resin.

Example 10

A joined body was prepared by the same method as that in Example 2 except that a fastening rod 4-23 using polypropylene (Prime Polypro J108M) was used instead of the Nylon 6 resin A1030 which was used as the thermoplastic resin.

Example 11

When the fastening rod was manufactured, the member Y1 was cut to have a suitable size, and was subjected to press molding to be a fastening rod in the shape of "4" in FIG. 2A in which the rod diameter was 8 mm, and the rod length was 19 mm without using injection molding, and thus a fastening rod 4-24 was manufactured. Accordingly, a joined body was prepared by the same method as that in Example 2 except that the average fiber length of the carbon fiber in the fastening rod was adjusted to be 7 mm.

Comparative Example 2

A joined body was prepared by the same method as that in Example 2 except that a fastening rod 4-25 was used in which the carbon fiber was changed to a glass fiber.

Comparative Example 3

When an epoxy resin in a semi-cured state was used instead of the Nylon 6 resin A1030 which was used as the thermoplastic resin, it is not possible to perform the caulking by using the ultrasonic waves because the epoxy resin was in a semi-cured state.

4. Various Examples Using Fastening Rod Including Protrusion

Hereinafter, various examples of the fastening rod including the protrusion will be described.

In the section of "4. Various Examples Using Fastening Rod Including Protrusion", a case where the fastening rod is simply referred to as a "fastening rod" indicates a fastening rod including one or more protrusion unless otherwise specified. In addition, all of the fastening rods including the protrusion are an example of the fastening rod. In addition, when the joined body using the fastening rod including the protrusion is described, in order to specify the member(s) Yi, the member may be referred to as the first member and the second member, and both thereof are an example of the member(s) Yi.

4.1 Reference Example 2

Member 182

Hereinafter, an isotropic random mat was used as the member 182, and thus the test described above was performed. The member 182 was used as the first member and the second member of the present invention.

The isotropic random mat is as follows.

As the carbon fiber, a carbon fiber "Tenax" (registered trademark) STS40-24KS (the average fiber diameter of 7 µm) manufactured by Toho Tenax Co., Ltd. which was cut to have the average fiber length of 30 mm was used and as the matrix, a Nylon 6 resin A1030 manufactured by Unitika Limited was used to prepare a carbon fiber mat containing a Nylon 6 resin in which the carbon fibers were isotropically oriented in a plane direction, the carbon fiber areal weight was 1800 g/m² and the Nylon 6 resin areal weight was 1500 g/m² on the basis of a method disclosed in Pamphlet of International Publication No. WO 2012/105080.

The obtained carbon fiber mat containing a resin was heated at 2.0 MPa for 5 minutes by a pressing device which was heated at 260° C. by using a mold including a concave portion at an upper portion, thus a flat plate having a thickness of 2.3 mm was obtained.

The obtained flat plate was cut to have a size of 390 mm×390 mm, was dried by a hot air drier at 120° C. for 4 hours, and then the temperature of the flat plate was increased up to 280° C. by an infrared ray heater. A mold including a cavity of 400 mm×400 mm was set at 140° C., and the heated flat plate was introduced to the mold.

Subsequently, the flat plate was pressed at a pressing pressure of 5 MPa for 1 minute, and thus a member precursor of 400 mm×400 mm×2.5 mm (thickness) was obtained. This precursor was cut to have a size of 25 mm×75 mm, a fitting hole 85 having a diameter of 8 mm was disposed at the center by using a HAM342 carbide FRP drill, and thus the member 182 was obtained.

4.2 Fastening Rod Including Protrusion

As the carbon fiber, a carbon fiber "Tenax" (registered trademark) STS40-24KS (the average fiber diameter of 7 µm) manufactured by Toho Tenax Co., Ltd. which was cut to have the average fiber length of 20 mm, and as the matrix, a Nylon 6 resin A1030 manufactured by Unitika Limited were put into a twin screw kneading extruder (KTX-30, manufactured by Kobe Steel Ltd.), and thus the fastening rod 181 of Example 1 described below was manufactured.

Furthermore, the input amount of the carbon fiber was adjusted, and thus the carbon fibers were prepared in which the weight ratio (%) of the carbon fiber in the fastening rod 181 was adjusted to be 35%, 13%, and 45%. The carbon fiber was a single yarn form, and all of the average fiber lengths were 0.3 mm. Furthermore, JSW180H manufactured by Japan Steel Works, Ltd. was used as the injection molding machine.

Example 13

The fastening rod 181 is molded by putting 100 parts by weight of the carbon fiber and 185 parts by weight of the Nylon 6 resin into the extruder. That is, the weight ratio (the fiber weight content ratio) of the carbon fiber in the fastening rod is 35%. The maximum outer diameter of the head part of the fastening rod 181 is 12.8 mm, and the minimum outer diameter of the other end portion is 7.1 mm. In addition, a length from the one end to the other end of the fastening rod 181 was 28.5 mm. The number of protrusions 184 is 8, and the maximum outer diameter in a position in which the protrusion 184 is included is 9.1 mm. In the protrusion 184, the width is 0.5 mm, and the length is 4 mm. The shape of the protrusion is as illustrated in FIG. 12A, and a fastening rod used in Example 13 was set to a fastening rod 181-1.

The fastening rod 181-1 described above is inserted into the first fitting hole 185 (the diameter of the opening is 8.96 mm) of the first member 182 from the other end portion.

Subsequently, as illustrated in FIG. 12A, the head part of the fastening rod 181-1 was inserted at an inserting load (42 N) in the arrow direction, and thus an intermediate body which was formed by being engaged with the first member 182 was obtained. The fastening rod 181-1 was not detached from the intermediate body while this intermediate body was moved to a separate room and then was subjected to the next operation.

Subsequently, the other end portion of the fastening rod 181-1 which was engaged with this intermediate body was inserted into the second fitting hole of the second member (the diameter of the opening was 8.96 mm). The other end portion of the fastening rod 181 protruding from the second fitting hole was caulked by heat by applying the ultrasonic waves as illustrated in FIGS. 11A to 11C, and thus a joined body was obtained. The caulking was performed by using an ultrasonic machine (2000×800 W 40 kHz, manufactured by BRANSON Ultrasonics), and the caulking conditions included a caulking time of 8 seconds, an amplitude of 30 µm, and a pressing force of 0.15 kN. In the obtained joined body, the first member and the second member were extremely rigidly fastened.

The first fitting hole 185 of the first member 182 is in the shape of a cylinder, and the diameter of the opening is 8.96 mm. Therefore, a press-in tightening margin is 0.14 mm (9.10 mm-8.96 mm) as shown in Table 3.

The inserting load at the time of inserting the fastening rod 181-1 into the first fitting hole 185 of the first member 182 is 42 N, and the separating load from the first fitting hole 85 is 22 N as shown in Table 3. The results thereof are shown in Table 3.

Example 14

Example 14 is different from Example 13 in that the diameter of the first fitting hole 185 of the first member 182 is 8.85 mm, and the press-in tightening margin is 0.24 mm (refer to Table 3). A fastening rod used in Example 14 was a fastening rod 181-2. The fastening rod 181-2 is different from the fastening rod 181-1 in a range of error in manufacture. The inserting load of the fastening rod 181-2 into the first fitting hole 85 is 84 N, and the separating load of the fastening rod 181-2 from the first fitting hole 185 is 43 N.

Except for those described above, an intermediate body was obtained by the same method as that in Example 13, and then was subjected to the thermal caulking by applying the ultrasonic waves to be fastened to the second member, and thus a joined body was obtained.

Example 15

Example 15 is different from Example 13 in that the diameter of the first fitting hole 85 of the first member 182 is 8.81 mm, and the press-in tightening margin is 0.30 mm (refer to Table 3). A fastening rod used in Example 15 was a fastening rod 181-3. The fastening rod 181-3 is different from the fastening rod 181-1 in a range of error in manufacture. The inserting load of the fastening rod 181-3 into the first fitting hole 185 is 150 N, and the separating load of the fastening rod 181-3 from the first fitting hole 185 is 62 N.

Except for those described above, an intermediate body was obtained by the same method as that in Example 13, and then was subjected to the thermal caulking by applying the ultrasonic waves to be fastened to the second member, and thus a joined body was obtained.

Example 16

Example 16 is different from Example 13 in that the diameter of the first fitting hole 185 of the first member 182 is 8.72 mm, and the press-in tightening margin is 0.39 mm (refer to Table 3). A fastening rod used in Example 16 was a fastening rod 181-4. The fastening rod 181-4 is different from the fastening rod 181-1 in a range of error in manufacture. The inserting load of the fastening rod 181-4 into the first fitting hole 185 is 200 N, and the separating load of the fastening rod 181-4 from the first fitting hole 185 is 86 N. Except for those described above, an intermediate body was obtained by the same method as that in Example 13, and then was subjected to the thermal caulking by applying the ultrasonic waves to be fastened to the second member, and thus a joined body was obtained.

Example 17

Example 17 is different from Example 13 in that the diameter of the first fitting hole 85 of the first member 182 is 8.49 mm, and the press-in tightening margin is 0.61 mm (refer to Table 3). A fastening rod used in Example 17 was a fastening rod 181-5. The inserting load of the fastening rod 181-5 into the first fitting hole 185 is 400 N, and the separating load of the fastening rod 181-5 from the first fitting hole 185 is 96 N.

Except for those described above, an intermediate body was obtained by the same method as that in Example 13, and then was subjected to the thermal caulking by applying the ultrasonic waves to be fastened to the second member, and thus a joined body was obtained.

Example 18

The fastening rod 181 is molded by putting 100 parts by weight of the carbon fiber and 670 parts by weight of the Nylon 6 resin into the extruder. That is, the fiber weight content rate is 13%, and thus is different from Example 13 (refer to Table 3). The number of protrusions is 8, and the maximum outer diameter of the protrusion portion is 9.07 mm. A fastening rod used in Example 18 was a fastening rod 181-6.

The diameter of the first fitting hole 185 of the first member 182 is 8.81 mm, and the press-in tightening margin is 0.26 mm. The inserting load of the fastening rod 181-6 into the first fitting hole 185 is 74 N, and the separating load of the fastening rod 181-6 from the first fitting hole 185 is 44 N.

Except for those described above, an intermediate body was obtained by the same method as that in Example 13, and then was subjected to the thermal caulking by applying the ultrasonic waves to be fastened to the second member, and thus a joined body was obtained.

Example 19

In the fastening rod 181, 100 parts by weight of the carbon fiber and 122 parts by weight of the Nylon 6 resin are put into the extruder. That is, the fiber weight content rate is 45%, the number of protrusions is 8, and the maximum outer diameter of the protrusion portion is 9.11 mm (refer to Table 3). A fastening rod used in Example 19 was a fastening rod 181-7.

The diameter of the first fitting hole 185 of the first member 182 is 8.85 mm, and the press-in tightening margin is 0.26 mm. The inserting load of the fastening rod 181-7 into the first fitting hole 185 is 107 N, and the separating load of the fastening rod 181-7 from the first fitting hole 185 is 54 N.

Except for those described above, an intermediate body was obtained by the same method as that in Example 13, and then was subjected to the thermal caulking by applying the ultrasonic waves to be fastened to the second member, and thus a joined body was obtained.

Example 20

The fiber weight content rate of the fastening rod 181 is 35%, the number of protrusions 184 is 4, and the maximum outer diameter of the protrusion 184 is 9.10 mm (refer to Table 3). A fastening rod used in Example 20 was a fastening rod 181-8.

The diameter of the first fitting hole 185 of the first member 182 is 8.85 mm, and the press-in tightening margin is 0.25 mm. The inserting load of the fastening rod 181-8 into the first fitting hole 185 is 40 N, and the separating load of the fastening rod 181-8 from the first fitting hole 185 is 18 N.

Except for those described above, an intermediate body was obtained by the same method as that in Example 13, and then was subjected to the thermal caulking by applying the ultrasonic waves to be fastened to the second member, and thus a joined body was obtained.

5. Example of Joined Body Having Concaves and Convexes in Surface of Fastening Rod Example 21

A joined body was obtained by the same method as that in Example 1 except that a fastening rod 4-7 having concaves and convexes in the vicinity of the other end portion of the fastening rod as illustrated in FIG. 14. In addition, the fastening rod 4-7 was prepared by disposing concaves and convexes by knurling the surface of the fastening rod 4-1 which was used in Example 1.

The results thereof are shown in Table 4.

6. Example of Joined Body Caulked in State where Gap is Formed Between Fastening Rod and Second Fitting Hole Example 22

Figure 17:
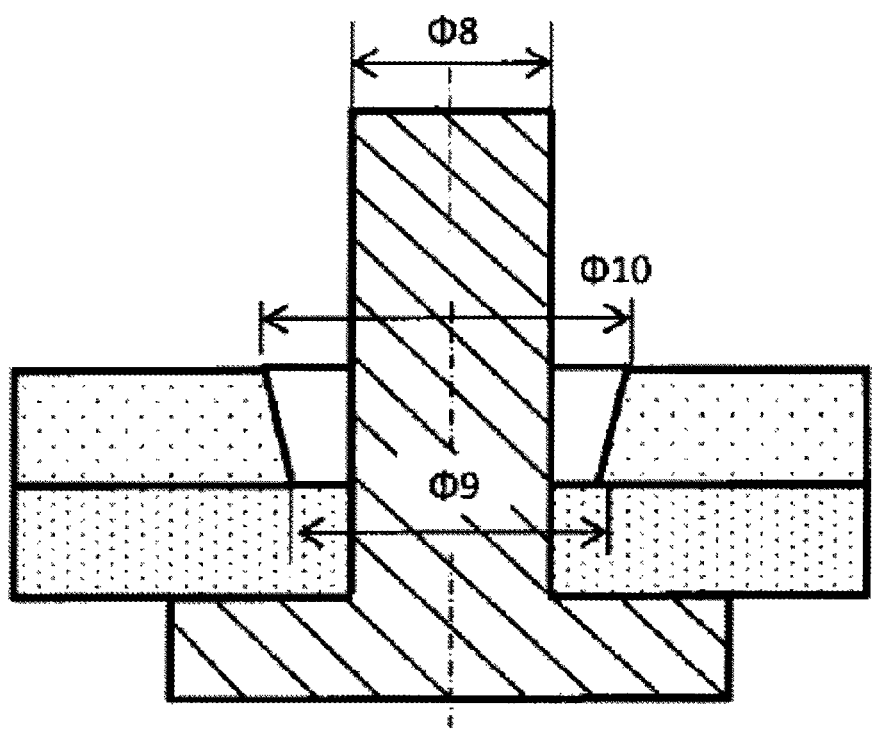
FIG. 17 is a diagram illustrating an example of a state in which a gap is present between the fastening rod and a second fitting hole.

As illustrated in FIG. 17, a joined body was obtained by the same method as that in Example 1 except that the size of the second fitting hole was set so that a side which was in contact with the first member was 9 mm and the other end portion side was 10 mm.

The results thereof are shown in Table 4.

TABLE 1

| | Example 1 | Example 2 | Example 3 | Example 4 | Example 5 | Example 6 | Comparative Example 1 |
|---|---|---|---|---|---|---|---|
| Member Fastening Rod | Y1/Y1 | Y1/Y1 | Y1/Y1 | Y1/Y2 | Y1/Y1 | Y1/Y1 | Y1/Y1 |
| Type of Fastening Rod | Fastening Rod 4-1 | Fastening Rod 4-2 | Fastening Rod 4-3 | Fastening Rod 4-1 | Fastening Rod 4-4 | Fastening Rod 4-5 | Fastening Rod 4-6 |

TABLE 1-continued

|  | Example 1 | Example 2 | Example 3 | Example 4 | Example 5 | Example 6 | Comparative Example 1 |
|---|---|---|---|---|---|---|---|
| Weight Ratio of Carbon Fiber in Fastening Rod (%) | 25 | 35 | 45 | 35 | 35 | 35 | 0 |
| Reinforcing Fiber | Carbon Fiber | Carbon Fiber | Carbon Fiber | Carbon Fiber | Carbon Fiber | Carbon Fiber | None |
| Average Fiber Length mm | 0.3 | 0.3 | 0.3 | 0.3 | 0.3 | 0.3 | — |
| Buckling Stress MPa | 95 | 100 | 110 | 100 | 90 | 130 | 45 |
| Rod Diameter mm | 8 | 8 | 8 | 8 | 6 | 10 | 8 |
| Rod Length mm | 19 | 19 | 19 | 19 | 19 | 19 | 19 |
| Ultrasonic Wave Conditions |  |  |  |  |  |  |  |
| Caulking Time Second | 5 | 5 | 5 | 5 | 3 | 7 | 9 |
| Amplitude μm | 30 | 30 | 30 | 30 | 30 | 30 | 30 |
| Pressing Force kN | 0.15 | 0.15 | 0.15 | 0.15 | 0.15 | 0.15 | 0.15 |
| Other Conditions | — | — | — | — | — | — | — |
| Joined Body |  |  |  |  |  |  |  |
| Cross Tension Strength kN | 3.0 | 3.3 | 3.5 | 3.3 | 1.8 | 5.1 | 1.0 |

TABLE 2

|  | Example 7 | Example 8 | Example 9 | Example 10 | Example 11 | Comparative Example 2 | Comparative Example 3 |
|---|---|---|---|---|---|---|---|
| Member Fastening Rod | Y1/Y1 | Y1/Y1 | Y1/Y1 | Y1/Y1 | Y1/Y1 | Y1/Y1 | Y1/Y1 |
| Type of Fastening Rod | Fastening Rod 4-2 | Fastening Rod 4-21 | Fastening Rod 4-22 | Fastening Rod 4-23 | Fastening Rod 4-24 | Fastening Rod 4-25 | Fastening Rod 4-26 |
| Resin | Nylon 6 | Nylon 6 | Polycarbonate | Polypropylene | Nylon 6 | Nylon 6 | Epoxy in Semi-Cured State |
| Weight Ratio of Carbon Fiber in Fastening Rod (%) | 35 | 35 | 35 | 35 | 35 | 35 | 35 |
| Reinforcing Fiber | Carbon Fiber | Carbon Fiber | Carbon Fiber | Carbon Fiber | Carbon Fiber | Glass Resin | Carbon Fiber |
| Average Fiber Length mm | 0.3 | 0.5 | 0.3 | 0.3 | 7 | 0.3 | 0.3 |
| Buckling Stress MPa | 100 | 110 | 106 | 42 | 160 | 80 | 3 |
| Rod Diameter mm | 8 | 8 | 8 | 8 | 8 | 8 | 8 |
| Rod Length mm | 19 | 19 | 19 | 19 | 19 | 19 | 19 |
| Caulking Method | Thermal Caulking | Ultrasonic Caulking | Ultrasonic Caulking | Ultrasonic Caulking | Ultrasonic Caulking | Ultrasonic Caulking | — |
| Caulking Time Second | 4 | 5 | 5 | 5 | 5 | 5 | — |
| Amplitude μm | — | 30 | 30 | 30 | 30 | 30 | — |
| Pressing Force kN | 0.15 | 0.15 | 0.15 | 0.15 | 0.15 | 0.15 | — |
| Other Conditions | Thermal Caulking Temperature 320° C. | — | — | — | — | — | — |
| Joined Body |  |  |  |  |  |  |  |
| Cross Tension Strength kN | 2.2 | 3.5 | 3.2 | 1.8 | 4.5 | 2.6 | — |

TABLE 3

| Items | Example 13 | Example 14 | Example 15 | Example 16 | Example 17 | Example 18 | Example 19 | Example 20 |
|---|---|---|---|---|---|---|---|---|
| Fastening Rod |  |  |  |  |  |  |  |  |
| Type | Fastening Rod 181-1 | Fastening Rod 181-2 | Fastening Rod 181-3 | Fastening Rod 181-4 | Fastening Rod 181-5 | Fastening Rod 181-6 | Fastening Rod 181-7 | Fastening Rod 181-8 |
| Weight Ratio of Carbon Fiber in Fastening Rod (%) | 35 | 35 | 35 | 35 | 35 | 13 | 45 | 35 |
| Maximum Outer Diameter of Protrusion Portion [mm] | 9.10 | 9.09 | 9.11 | 9.11 | 9.10 | 9.07 | 9.11 | 9.10 |
| Number of Ribs [Unit] | 8 | 8 | 8 | 8 | 8 | 8 | 8 | 4 |
| First Member Diameter of First Fitting Hole [mm] | 8.96 | 8.85 | 8.81 | 8.72 | 8.49 | 8.81 | 8.85 | 8.85 |
| Press-in Tightening Margin [mm] | 0.14 | 0.24 | 0.30 | 0.39 | 0.61 | 0.26 | 0.26 | 0.25 |
| Inserting Load [N] | 42 | 84 | 150 | 200 | 400 | 74 | 107 | 40 |

TABLE 3-continued

| Items | Example 13 | Example 14 | Example 15 | Example 16 | Example 17 | Example 18 | Example 19 | Example 20 |
|---|---|---|---|---|---|---|---|---|
| Separating Load [N] | 22 | 43 | 62 | 86 | 96 | 44 | 54 | 18 |
| State after Being Pressed in | ○ (Excellent) | ○ (Excellent) | ○ (Excellent) | ○ (Excellent) | Δ (Good) | ○ (Excellent) | ○ (Excellent) | ○ (Excellent) |

TABLE 4

| | Example 21 | Example 22 |
|---|---|---|
| Member Fastening Rod | Y1/Y1 | Y1/Y1 |
| Type of Fastening Rod | Fastening Rod 4-7 | Fastening Rod 4-1 |
| Weight Ratio of Carbon Fiber in Fastening Rod (%) | 25 | 25 |
| Reinforcing Fiber | Carbon Fiber | Carbon Fiber |
| Average Fiber Length mm | 0.3 | 0.3 |
| Buckling Stress MPa | 95 | 95 |
| Rod Diameter mm | 8 | 8 |
| Rod Length mm | 19 | 19 |
| Other Shapes | Concaves and Convexes Illustrated in FIG. 14 Were Disposed On Surface in Vicinity of Other End Portion of Fastening Rod 201. | — |
| First Fitting Hole mm | 8 | 8 |
| Second Fitting Hole mm | 8 | Side in Contact with First Member: 9 mm Other End Side: 10 mm |
| Ultrasonic Wave Conditions | | |
| Caulking Time Second | 5 | 5 |
| Amplitude μm | 30 | 30 |
| Pressing Force kN | 0.15 | 0.15 |
| Other Conditions | — | — |
| Joined Body | | |
| Cross Tension Strength kN | 25% Greater Than That of Example 1 | 12.5% Greater Than That of Example 1 |

INDUSTRIAL APPLICABILITY

The joined body of the present invention has excellent joining strength, for example, may be used for the usage in which the excellent joining strength of structural components such as an automobile is required, and reliably reduces the weight of a vehicle body. In the joined body of the present invention, the fastening rod is inserted into the fitting hole and a portion protruding from at least one member Yi is caulked, and thus two or more members Yi are fastened. In particular, when both of two or more members Yi including the fitting hole and the fastening rod inserted into the fitting hole are formed of the carbon fiber and the thermoplastic resin, the joined body is substantially formed of only two materials of the carbon fiber and the thermoplastic resin. Therefore, the joined body has not only excellent joining strength but also excellent lightweight properties and mechanical properties, and is advantageous for easy recycling.

REFERENCE SIGNS LIST

1: LENGTH OF FASTENING ROD
2: DIAMETER LENGTH OF CYLINDER PORTION OF FASTENING ROD
3: LENGTH OF MAXIMUM DIAMETER OF FASTENING ROD
4: EXAMPLE OF FASTENING ROD
5: PROTRUSION PORTION
6: FITTING HOLE
7: HORN TO APPLY ULTRASONIC WAVES
8: UMBRELLA PORTION AFTER CAULKING AND FASTENING ROD
Yi: MEMBER Yi
11, 121, 141, 151: FASTENING ROD
13, 123, 143, 153, 174, 176, 187: HEAD PART
14, 124, 144, 154: BODY PART
15, 125, 145, 155: MIDDLE PART
16, 126, 146, 156, 186: OTHER END PORTION (PROTRUSION PORTION)
17, 127, 147, 157, 161, 163, 166, 171, 173, 175, 184: PROTRUSION
111, 131, 182: FIRST MEMBER
113, 133: SECOND MEMBER
115, 135, 185: FIRST FITTING HOLE
117, 137: SECOND FITTING HOLE
119, 139: CAULKING PORTION
141, 151, 181: FASTENING ROD
172: HORN
188: JIG
190: JOINED BODY
201: FASTENING ROD HAVING CONCAVES AND CONVEXES
202: PORTION OF FASTENING ROD WHICH IS DEFORMED
203: PORTION OF FASTENING ROD WHICH IS NOT DEFORMED
204: INTERFACE BETWEEN PORTION OF FASTENING ROD WHICH IS DEFORMED AND PORTION OF FASTENING ROD WHICH IS NOT DEFORMED

The invention claimed is:

1. A joined body in which two or more members Yi are fastened, wherein
the two or more members Yi include a first member and a second member, and the first member and the second member respectively include a first fitting hole and a second fitting hole through which a fastening rod including reinforcing fibers and a thermoplastic resin passes,
while in a state where one end portion of the fastening rod is positioned at a first member side and the other end portion of the fastening rod is positioned at a second member side, the other end portion of the fastening rod is caulked by heat to fasten the first member and the second member so that the members Yi are caulking-fastened, and the fastening rod includes one or more protrusions which are engaged with at least one of the first fitting hole and the second fitting hole,
an average fiber length of the reinforcing fibers is in a range of 0.01 mm to 10 mm, wherein the protrusion is formed in a region facing a circumferential surface of at least one of the first fitting hole and the second fitting hole, the protrusion is in the shape of a rib extending along a central axis of the fastening rod, and wherein a protruding size of the protrusion increases as being closer to the one end portion.

2. The joined body according to claim 1, wherein the thermal caulking is performed by applying ultrasonic waves.

3. The joined body according to claim 1, wherein a separating load of the fastening rod from at least one of the first fitting hole and the second fitting hole is greater than or equal to 1 N.

4. The joined body according to claim 1, wherein the average fiber length of the reinforcing fibers is in a range of 0.01 mm to 5 mm.

5. The joined body according to claim 1, wherein the average fiber length of the reinforcing fibers is in a range of 0.01 mm to 3 mm.

\* \* \* \* \*